(12) United States Patent
Greiner et al.

(10) Patent No.: US 7,773,842 B2
(45) Date of Patent: Aug. 10, 2010

(54) AMPLITUDE AND PHASE CONTROL IN DISTRIBUTED OPTICAL STRUCTURES

(76) Inventors: Christoph M. Greiner, LightSmyth Technologies Inc, 860 West Park, Suite 250, Eugene, OR (US) 97401; Dmitri Iazikov, LightSmyth Technologies Inc, 860 West Park, Suite 250, Springfield, OR (US) 97401; Thomas W. Mossberg, LightSmyth Technologies Inc, 860 West Park, Suite 250, Eugene, OR (US) 97401

( * ) Notice: Subject to any disclaimer, the term of this patent is extended or adjusted under 35 U.S.C. 154(b) by 180 days.

(21) Appl. No.: 11/280,876

(22) Filed: Nov. 15, 2005

(65) Prior Publication Data

US 2006/0177178 A1 Aug. 10, 2006

Related U.S. Application Data

(63) Continuation-in-part of application No. 10/989,236, filed on Nov. 15, 2004, now Pat. No. 6,965,716, which is a continuation of application No. 10/653,876, filed on Sep. 2, 2003, now Pat. No. 6,829,417, and a continuation-in-part of application No. 10/229,444, filed on Aug. 27, 2002, now Pat. No. 6,678,429.

(60) Provisional application No. 60/468,479, filed on May 7, 2003, provisional application No. 60/486,450, filed on Jul. 10, 2003, provisional application No. 60/370,182, filed on Apr. 4, 2002, provisional application No. 60/315,302, filed on Aug. 27, 2001.

(51) Int. Cl.
*G02B 6/34* (2006.01)
*G02B 6/26* (2006.01)
(52) U.S. Cl. .......................... 385/37; 385/39
(58) Field of Classification Search .................. 385/14, 385/31, 37, 39, 47, 49
See application file for complete search history.

(56) References Cited

U.S. PATENT DOCUMENTS 3,995,937 A 12/1976 Baues et al.

(Continued)

FOREIGN PATENT DOCUMENTS

EP 0310438 A1 4/1989

(Continued)

OTHER PUBLICATIONS

Mossberg, T.W.; "Planar Holographic Optical Processing Devices," 2001 Optical Society of America; Optics Letters, vol. 26, No. 7; Apr. 1, 2001.

(Continued)

*Primary Examiner*—Kevin S Wood
(74) *Attorney, Agent, or Firm*—Schwabe, Williamson & Wyatt, P.C.

(57) ABSTRACT

A distributed optical structure comprises a set of diffractive elements. Individual diffractive element transfer functions collectively yield an overall transfer function between entrance and exit ports. Diffractive elements are defined relative to virtual contours and include diffracting region(s) altered to diffract, reflect, and/or scatter incident optical fields (altered index, surface, etc). Element and/or overall set transfer functions (amplitude and/or phase) are determined by: longitudinal and/or angular displacement of diffracting region(s) relative to a virtual contour (facet-displacement grayscale); longitudinal displacement of diffractive elements relative to a virtual contour (element-displacement grayscale); and/or virtual contour(s) lacking a diffractive element (proportional-line-density gray scale). Optical elements may be configured: as planar or channel waveguides, with curvilinear diffracting segments; to support three-dimensional propagation with surface areal diffracting segments; as a diffraction grating, with grating groove or line segments.

20 Claims, 23 Drawing Sheets

U.S. PATENT DOCUMENTS

| | | |
|---|---|---|
| 4,006,967 A | 2/1977 | Kenan et al. |
| 4,140,362 A | 2/1979 | Tien |
| 4,387,955 A | 6/1983 | Ludman et al. |
| 4,440,468 A | 4/1984 | Auracher et al. |
| 4,660,934 A | 4/1987 | Akiba et al. |
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |
| 4,834,474 A | 5/1989 | George et al. |
| 4,846,552 A | 7/1989 | Veldkamp et al. |
| 4,852,960 A | 8/1989 | Alferness et al. |
| 4,923,271 A | 5/1990 | Henry et al. |
| 4,938,553 A | 7/1990 | Maerz et al. |
| 5,040,864 A | 8/1991 | Hong |
| 5,093,874 A | 3/1992 | Hawkins et al. |
| 5,107,359 A | 4/1992 | Ohuchida |
| 5,165,104 A | 11/1992 | Weverka |
| 5,195,161 A | 3/1993 | Adar et al. |
| 5,274,657 A | 12/1993 | Hori et al. |
| 5,357,591 A | 10/1994 | Jiang |
| 5,450,511 A | 9/1995 | Dragone |
| 5,453,871 A | 9/1995 | Kolner et al. |
| 5,668,900 A | 9/1997 | Little et al. |
| 5,768,450 A | 6/1998 | Bhagavatula |
| 5,812,318 A | 9/1998 | Babbitt et al. |
| 5,830,622 A | 11/1998 | Canning et al. |
| 5,907,647 A | 5/1999 | Eggleton et al. |
| 5,995,691 A | 11/1999 | Arai et al. |
| 6,011,884 A | 1/2000 | Dueck et al. |
| 6,011,885 A | 1/2000 | Dempewolf et al. |
| 6,137,933 A | 10/2000 | Hunter et al. |
| 6,144,480 A | 11/2000 | Li et al. |
| 6,169,613 B1 | 1/2001 | Amitai et al. |
| 6,169,614 B1 | 1/2001 | Whitcomb et al. |
| 6,243,514 B1 | 6/2001 | Thompson |
| 6,266,463 B1 | 7/2001 | Laming et al. |
| 6,285,813 B1 | 9/2001 | Schultz et al. |
| 6,323,970 B1 | 11/2001 | Popovich |
| 6,408,118 B1 | 6/2002 | Ahuja et al. |
| 6,473,232 B2 | 10/2002 | Ogawa |
| 6,553,162 B1 | 4/2003 | Okayama |
| 6,603,901 B1 | 8/2003 | Hale et al. |
| 6,678,429 B2 | 1/2004 | Mossberg et al. |
| 6,702,897 B2 | 3/2004 | Cullen et al. |
| 6,718,093 B2 | 4/2004 | Zhou |
| 6,768,834 B1 | 7/2004 | Gruhlke |
| 6,781,944 B1 | 8/2004 | Tanaka |
| 6,813,048 B2 | 11/2004 | Kitamura |
| 6,823,115 B2 | 11/2004 | Greiner et al. |
| 6,829,417 B2 | 12/2004 | Greiner et al. |
| 6,836,492 B2 | 12/2004 | Ido |
| 6,850,670 B2 | 2/2005 | Parhami et al. |
| 6,859,318 B1 | 2/2005 | Mossberg |
| 6,876,791 B2 | 4/2005 | Murashima et al. |
| 6,879,441 B1 | 4/2005 | Mossberg |
| 6,928,223 B2 | 8/2005 | Walpole et al. |
| 6,961,491 B2 | 11/2005 | Greiner et al. |
| 6,965,464 B2 | 11/2005 | Mossberg |
| 6,965,716 B2 | 11/2005 | Greiner et al. |
| 6,985,656 B2 | 1/2006 | Iazikov et al. |
| 6,987,911 B2 | 1/2006 | Mossberg |
| 6,990,276 B2 | 1/2006 | Brice et al. |
| 6,993,223 B2 | 1/2006 | Greiner et al. |
| 7,003,187 B2 | 2/2006 | Frick et al. |
| 7,009,743 B2 | 3/2006 | Mossberg |
| 7,016,569 B2 | 3/2006 | Mule et al. |
| 7,049,704 B2 | 5/2006 | Chakravorty et al. |
| 7,054,517 B2 | 5/2006 | Mossberg et al. |
| 7,062,128 B2 | 6/2006 | Mossberg |
| 7,116,453 B2 | 10/2006 | Mossberg |
| 7,116,852 B2 | 10/2006 | Tuda |
| 7,120,334 B1 | 10/2006 | Greiner et al. |
| 7,123,794 B2 | 10/2006 | Greiner et al. |
| 7,181,103 B1 | 2/2007 | Greiner et al. |
| 7,190,859 B2 | 3/2007 | Greiner et al. |
| 7,194,161 B1 * | 3/2007 | Deri et al. ..................... 385/37 |
| 7,224,855 B2 * | 5/2007 | Iazikov et al. ................ 385/14 |
| 7,260,290 B1 | 8/2007 | Greiner et al. |
| 7,286,732 B2 | 10/2007 | Greiner et al. |
| 2002/0071646 A1 | 6/2002 | Eggleton et al. |
| 2003/0011833 A1 | 1/2003 | Yankov et al. |
| 2003/0039444 A1 | 2/2003 | Mossberg et al. |
| 2003/0067645 A1 | 4/2003 | Ibsen et al. |
| 2003/0068113 A1 | 4/2003 | Janz et al. |
| 2003/0117677 A1 | 6/2003 | Mossberg |
| 2003/0206694 A1 | 11/2003 | Babin et al. |
| 2004/0047561 A1 | 3/2004 | Tuda |
| 2004/0076374 A1 | 4/2004 | Greiner et al. |
| 2004/0131360 A1 | 7/2004 | Iazikov et al. |
| 2004/0170356 A1 | 9/2004 | Iazikov et al. |
| 2004/0173680 A1 | 9/2004 | Mossberg et al. |
| 2004/0179779 A1 | 9/2004 | Greiner et al. |
| 2004/0208466 A1 | 10/2004 | Mossberg et al. |
| 2004/0258356 A1 | 12/2004 | Brice et al. |
| 2005/0018951 A1 | 1/2005 | Mossberg et al. |
| 2005/0063430 A1 | 3/2005 | Doucet et al. |
| 2005/0078912 A1 | 4/2005 | Iazikov et al. |
| 2005/0135744 A1 | 6/2005 | Greiner et al. |
| 2005/0135745 A1 | 6/2005 | Greiner et al. |
| 2005/0135747 A1 | 6/2005 | Greiner et al. |
| 2005/0152011 A1 | 7/2005 | Mossberg |
| 2005/0163425 A1 | 7/2005 | Greiner et al. |
| 2005/0196114 A1 | 9/2005 | Xu et al. |
| 2006/0023280 A1 | 2/2006 | Mossberg |
| 2006/0139712 A1 | 6/2006 | Mossberg |
| 2006/0177178 A1 | 8/2006 | Greiner et al. |
| 2006/0193553 A1 | 8/2006 | Mossberg et al. |
| 2006/0210214 A1 | 9/2006 | Uhlhorn et al. |
| 2006/0233493 A1 | 10/2006 | Mossberg |
| 2006/0256831 A1 | 11/2006 | Volodin et al. |

FOREIGN PATENT DOCUMENTS

| | | |
|---|---|---|
| GB | 2168215 A | 6/1986 |
| JP | 04368901 | 12/1992 |
| JP | 05019726 | 5/1993 |
| JP | 1031121 | 2/1998 |
| JP | 2003033805 | 2/2003 |
| WO | 9935523 A1 | 7/1999 |
| WO | 9956159 A1 | 11/1999 |
| WO | WO 99/56159 | 11/1999 |
| WO | WO 02054120 A1 | 7/2002 |
| WO | 02075411 A1 | 9/2002 |
| WO | WO 02/075411 | 9/2002 |

OTHER PUBLICATIONS

Lohmann et al., "Graphic Codes for Computer Holography," Applied Optics, vol. 34, No. 17; Jun. 10, 1995.

Hirayama et al., "Novel Surface Emitting Laser Diode Using Photonic Band-Gap Cavity," Appl. Phys. Lett. 69(6), Aug. 5, 1996.

Mossberg, Planar Holographic Optical Processing Devices, Optics Letters, USA, Optical Society of America, vol. 26, No. 7, pp. 414-416 (Apr. 1, 2001).

International Preliminary Examination Report, mailed Feb. 23, 2004 for application PCT/US02/27288.

International Preliminary Examination Report, mailed Jul. 26, 2004 for application PCT/US02/08199.

International Preliminary Examination Report, mailed Oct. 10, 2006 for application PCT/US02/12869.

International Search Report, mailed Aug. 22, 2002 for application PCT/US02/08199.
International Search Report, mailed Jan. 2, 2003 for application PCT/US02/27288.
International Search Report, mailed Feb. 26, 2003 for application PCT/US02/12869.
International Search Report, mailed May 5, 2004 for application PCT/US03/27472.
Reasons for Allowance, mailed Sep. 23, 2003 for U.S. Appl. No. 10/229,444.
Reasons for Allowance, mailed Nov. 19, 2004 for U.S. Appl. No. 09/811,081.
Reasons for Allowance, mailed Nov. 19, 2004 for U.S. Appl. No. 10/602,327.
Reasons for Allowance, mailed May 6, 2005 for U.S. Appl. No. 10/989,236.
Reasons for Allowance, mailed May 19, 2005 for U.S. Appl. No. 09/843,597.
Reasons for Allowance, mailed Jul. 22, 2005 for U.S. Appl. No. 10/923,455.
Reasons for Allowance, mailed Aug. 5, 2005 for U.S. Appl. No. 10/794,634.
Reasons for Allowance, mailed Sep. 15, 2005 for U.S. Appl. No. 10/998,185.
Reasons for Allowance, mailed Sep. 15, 2005 for U.S. Appl. No. 10/857,987.
Reasons for Allowance, mailed Sep. 16, 2005 for U.S. Appl. No. 10/842,790.
Reasons for Allowance, mailed Dec. 5, 2005 for U.S. Appl. No. 11/239,540.
Reasons for Allowance, mailed Jun. 12, 2006 for U.S. Appl. No. 11/055,559.
Reasons for Allowance, mailed Aug. 3, 2006 for U.S. Appl. No. 11/361,407.
Reasons for Allowance, mailed Oct. 13, 2006 for U.S. Appl. No. 11/062,109.
Reasons for Allowance, mailed Dec. 19, 2006 for U.S. Appl. No. 11/532,532.
Reasons for Allowance, mailed Jan. 24, 2007 for U.S. Appl. No. 10/898,527.
Reasons for Allowance, mailed Jan. 25, 2007 for U.S. Appl. No. 11/383,494.
Reasons for Allowance, mailed Mar. 20, 2007 for U.S. Appl. No. 11/423,856.
Reasons for Allowance, mailed Aug. 20, 2007 for U.S. Appl. No. 11/685,212.
Reasons for Allowance, mailed Oct. 22, 2008 for U.S. Appl. No. 11/334,039.
Office Action, mailed Apr. 2, 2003 for U.S. Appl. No. 09/811,081.
Office Action, mailed Aug. 5, 2003 for U.S. Appl. No. 09/811,081.
Office Action, mailed Dec. 30, 2003 for U.S. Appl. No. 09/811,081.
Office Action, mailed May 18, 2004 for U.S. Appl. No. 10/653,876.
Office Action, mailed May 24, 2004 for U.S. Appl. No. 10/602,327.
Office Action, mailed Jun. 15, 2004 for U.S. Appl. No. 09/811,081.
Office Action, mailed Jun. 30, 2004 for U.S. Appl. No. 09/843,597.
Office Action, mailed Jan. 12, 2005 for U.S. Appl. No. 09/843,597.
Office Action, mailed Jul. 21, 2005 for U.S. Appl. No. 11/076,251.
Office Action, mailed Mar. 10, 2006 for U.S. Appl. No. 11/055,559.
Office Action, mailed Jun. 20, 2006 for U.S. Appl. No. 11/062,109.
Office Action, mailed Aug. 11, 2006 for U.S. Appl. No. 10/898,527.
Office Action, mailed Sep. 29, 2006 for U.S. Appl. No. 11/423,856.
Office Action, mailed Jun. 27, 2007 for U.S. Appl. No. 11/676,273.
Office Action, mailed Jan. 15, 2008 for U.S. Appl. No. 11/676,273.
Office Action, mailed May 30, 2008 for U.S. Appl. No. 11/334,039.
Office Action, mailed Aug. 8, 2008 for U.S. Appl. No. 11/676,273.
JP Office Action, mailed Aug. 15, 2008 for U.S. Appl. No. 2003-524057.
Office Action, mailed Apr. 7, 2009 for U.S. Appl. No. 11/676,273.
Alavie et al., "A Multiplexed Bragg Grating Fiber Laser Sensor System", IEE Photonics Tech. Lett., vol. 5 No. 9 pp. 1112-1114 (Sep. 1993).

Avrutsky et al., "Multiwavelength Diffraction and Apodization Using Binary Superimposed Gratings", IEEE Photonics Tech. Lett., vol. 10 No. 6 pp. 839-841 (Jun. 1998).
Babbitt et al., "Optical Waveform Processing Routing with Structured Surface Gratings", Opt. Commun., vol. 148 pp. 23-26 (1998).
Babbitt et al, "Spatial Routing of Optical Beams Through Time-Domain-Spatial-Spectral Filtering", Opt. Lett., vol. 20 No. 8 pp. 910-912 (Apr. 1995).
Backlund et al, Multifunctional grating couplers for bidirectional incoupling into planar waveguides., IEEE Photonics Tech. Lett., vol. 12 No. 3 pp. 315-316 (Mar. 2000).
Bates et al, Gaussian beams from variable groove depth grating couplers in planar waveguides, Appl. Opt, vol. 32 No. 12 pp. 2112-2116 (Apr. 1993).
Bedford et al, Bow-Tie Surface-Emitting Lasers, IEEE Photonics Technology Letters, vol. 12 No. 8 p. 948 (Aug. 2000).
Brady et al, Holographic Interconnections in Photorefractive Waveguides., Applied Optics, vol. 30 No. 17 p. 2324 (Jun. 1991).
Brazas et al, Analysis of input-grating couplers having finite lengths., Appl. Opt., vol. 34 No. 19 pp. 3786-3792 (Jul. 1995).
Brigham et al, Analysis of scattering from large planar gratings of compliant cylindrical shells, J. Acoust. Soc. A., vol. 61 No. 1 pp. 48-59 (Jan. 1977).
Canning et al, Grating structures with phase mask period in silica-on-silicon planar waveguides., Opt. Commun., vol. 171 pp. 213-217 (1999).
Capron et al, Design and Performance of a Multiple Element Slab Waveguide Spectrograph for Multimode Fiber-Optic WDM System., J. Lightwave Tech., vol. 11 No. 12 pp. 2009-2014 (Dec. 1993).
Chen et al, Guided-wave planar optical interconnects using highly multiplexed polymer waveguide holograms., J. Lightwave Tech., vol. 10 No. 7 pp. 888-897 (Jul. 1992).
Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).
Cowin et al., Compact polymeric wavelength division multiplexer., Electron. Lett., vol. 35 No. 13 pp. 1074-1076 (Jun. 1999).
Day et al, Filter-Response Line Shapes of Resonant Waveguide Grating., J. Lightwave Tech., vol. 14 No. 8 pp. 1815-1824 (Aug. 1998).
Deri et al, Quantitative Analysis of Integrated Optic Waveguide Spectromenters, IEEE Photonics Tech. Lett., vol. 6 No. 2 pp. 242-244 (Feb. 1994).
Eldada et al, Dispersive properties of planar polymer bragg gratings., IEEE Photonics Tech. Lett., vol. 12 No. 7 pp. 819-821 (Jul. 2000).
Eriksson et al, Parabolic-Confocal Unstable-Resonator Semiconductor Lasers-Modeling and Experiments, IEEE J. Quantum Electronics, vol. 34 No. 5 p. 858 (May 1998).
Eriksson et al, Surface-Emitting Unstable-Resonator Lasers with Integrated Diffractive Beam-Forming Elements, IEEE Photonics Technology Letters, vol. 9 No. 12 p. 1570 (Dec. 1997).
Fu et al, 1x8 supergrating wavelength-division demultiplexer in a silica planar waveguide., Opt. Lett., vol. 22 No. 21 pp. 1627-1629 (1997).
Gini et al, Polarization Independent InP WDM Multiplexer/Demultiplexer Module, J. Lightwave Tech., vol. 16 No. 4 pp. 625-630 (Apr. 1998).
Grunnet-Jepsen et al, Fibre Bragg grating based spectral encoder/decoder for lightwave CDMA, Electon. Lett., vol. 35 No. 13 pp. 1096-1097 (Jun. 1999).
Grunnett-Jepsen et al, Demonstration of All-Fiber Sparse Lighwave CDMA Based on Temporal Phase Encoding, Photonics Tech. Lett., vol. 11 No. 10 p. 1283 (Oct. 1999).
Henry, Four-Channel Wavelength Division Multiplexers and Bandpass Filters Based on Elliptical Bragg Reflectors,. J. Lightwave Tech., vol. 8 No. 5 99 748-755 (May 1990).
Hirayama et al., "Novel Surface Emitting Laser Diode Using Photonic Band-Gap Cavity, "Appl. Phys. Lett 69(6), Aug. 5, 1996.
Kaneko et al, Design and Applications for silica-based planar lightwave circuits., IEEE J. Sel. Top. Quant. Elec., vol. 5 No. 5 pp. 1227-1236 (Sep./Oct. 1999).
Kazarinov et al, Narrow-Band Resonant Optical Reflectors and Resonant Optical Transformers for Laser Stabilization and Wavelength Division Multiplexing, IEEE J. Quantum Electronics, vol. QE-23 No. 9 p. 1419 (Sep. 1987).

Koontz et al, Preservation of rectangular-patterned InP gratings overgrown by gas source molecular beam epitaxy., Appl. Phys. Lett., vol. 71 No. 10 pp. 1400-1402 (Sep. 1997).

Kristjansson et al, Surface-Emitting Tapered Unstable Resonator Laser with Integrated Focusing Grating Coupler, IEEE Photonics Technology Letters, vol. 12 No. 10 p. 1319 (Oct. 2000).

Kurokawa et al, Time-space-conversion optical signal processing using arrayed-waveguide grating., Electron. Lett., vol. 33 No. 22 pp. 1890-1891 (Oct. 1997).

Li, Analysis of planar waveguide grating couplers with double surface corrugations of identical periods., Opt. Commun., vol. 114 pp. 406-412 (1995).

Lohmann, et al., "Graphic Codes for Computer Holography," Applied Optics, vol. 34, No. 17, Jun. 10, 1995.

Madsen et al, Planar Waveguide Optical Spectrum Analyzer Using a UV-Induced Grating, IEEE J. Sel. Yop. Quant. Elec., vol. 4 No. 6 pp. 925-929 (Nov./Dec. 1998).

Magnusson et al, New Principle for optical filters., Appl. Phys. Lett., vol. 61 No. 9 pp. 1022-1024 (Aug. 1992).

McGreer, Tunable Planar Concave Grating Demultiplexer, IEEE Photonics Tech. Lett., vol. 8 No. 4 pp. 551-553 (Apr. 1996).

McGreer, Diffraction from Concave Gratings in Planar Waveguides, IEEE Phototonics Tech. Lett., vol. 7 No. 3 pp. 324-326 (Mar. 1995).

Minier et al, Diffraction characteristics of superimposed holographic gratings in planar optical waveguides, IEEE Photonics Tech. Lett., vol. 4 No. 10 p. 115 (Oct. 1992).

Miya, Silica-based planar lightwave circuits: passive thermally active devices., IEEE J. Sel. Top. Quant. Elec., vol. 6 No. 1 pp. 38-45 (Jan./Feb. 2000).

Modh et al, "Deep-Etched Distributed Bragg Reflector Lasers with Curved Mirrors-Experiments and Modeling" IEEE J. Quantum Electronics, vol. 37 No. 6 p. 752 (Jun. 2001).

Ojha et al, Demonstration of low loss integrated InGaAsP/InP demultiplexer device with low polarization sensitivity, Electron. Lett., vol. 29 No. 9 p. 805 (Apr. 1993).

Paddon et al, Simple approach to Coupling in Textured Planar Waveguides, Opt. Lett., vol. 23 No. 19 pp. 1529-1531 (1998).

Preston, "Digital holographic logic", Pattern Recognition, vol. 5, p. 37 (1973).

Rantala et al, Sol-gel hybrid glass diffractive elements by direct electron-beam exposure., Electron. Lett. vol. 34 No. 5 pp. 455-456 (Mar. 1998).

Song et al, Focusing-grating-coupler arrays for uniform and efficient signal distribution in a backboard optical interconnect., Appl. Opt., vol. 34 No. 26 pp. 5913-5919 (Sep. 1995).

Soole et al, High speed monolithic WDM detector for 1.5 um fibre band., Electron. Lett., vol. 31 No. 15 pp. 1276-1277 (Jul. 1995).

Subdo et al, Reflectivity of Integrated Optical filters Based on Elliptic Bragg Reflectors., Lightwave Tech., vol. 8 No. 6 pp. 998-1006 (Jun. 1990).

Sun et al, Demultiplexer with 120 channels and 0.29-nm channel spacing, IEEE Photonics Tech. Lett., vol. 10 No. 1 pp. 90-92 (Jan. 1998).

Taillaert, et al., Out-of-plane grating coupler for efficient butt-coupling between compact planar waveguides and single-mode fiberts, IEEE J. Quantum Electron., vol. 38, No. 7 (Jul. 2002).

Takenouchi et al, Analysis of optical-signal processing using an arrayed-waveguide grating., Optics Express, vol. 6 No. 6 pp. 124-135 (Mar. 2000).

Tang et al, A novel wavelength-division-demultiplexer with optical in-plane to surface-normal conversion, IEEE Photonics Tech. Lett., vol. 7 No. 8 p. 908 (Aug. 1995).

Taylor, et al., Determination of diffraction efficiency for a second-order corrugated waveguide, IEEE J. Quantum Electron., vol. 33, No. 2 (Feb. 1997).

Tien et al., "Use of Concentric-Arc Grating as a Thin-Film Spectrograph for Guided Waves" Appl. Phys. Lett. vol. 37 No. 6 pp. 524-525 (Sep. 15, 1980).

Ura et al., "Integrated Optic Wavelength Demultiplexer Using a Coplanar Grating Lens", Applied Optics, vol. 29 No. 9 pp. 1369-1373 (Mar. 20, 1990).

Wang et al., "Theory and Applications of Guided-Mode Resonance Filters", Applied Optics, vol. 32 No. 14 pp. 2606-2613 (May 10, 1993).

Wang, et al., "Wavelength-Division Multiplexing and Demultiplexing on Locally Sensitized Single-Mode Polymer Microstructure Waveguides", Optics Letters, vol. 15, No. 7., pp. 363-365 (Apr. 1, 1990).

Wang et al, "Five-Channel Polymer Waveguide Wavelength Division Demultiplexer for the Near Infrared", IEEE Photonics Technology Letters, vol. 3 No. 1 pp. 36-38 (Jan. 1991).

Wiesman et al., "Apodized Surface-Corrugated Gratings with Varying Duty Cycles", IEEE Photonics Technology Letters, vol. 12 No. 6 pp. 639-641 (Jun. 2000).

Wu et al., "Simplified Coupled-Wave Equations for Cylindrical Waves in Circular Grating Planar Waveguides", Journal of Lightwave Technology, vol. 10 No. 11 pp. 1575-1589 (Nov. 1992).

Notice of Allowance mailed Feb. 2, 2010 for U.S. Appl. No. 12/367,159.

Notices of Allowance mailed Jan. 8, 2010 and Feb. 5, 2010 for U.S. Appl. No. 11/676,273.

Office Action mailed Dec. 30, 2009 for U.S. Appl. No. 12/421,971.

Notice of Allowance mailed Mar. 2, 2010 for U.S. Appl. No. 12/403,281.

Office Action, issued in Japanese Patent Application No. 2003-524057, Mar. 18, 2010.

* cited by examiner

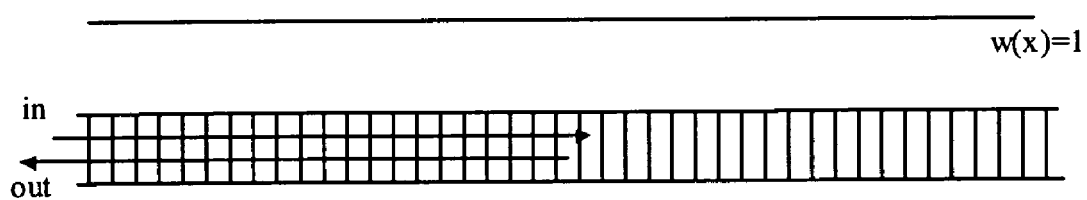
Figure 9a
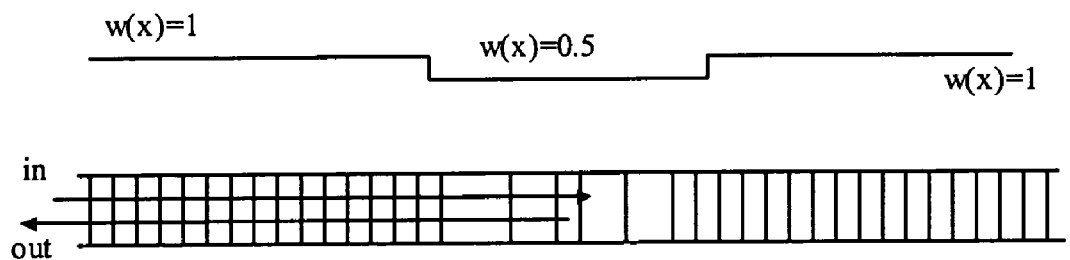
Figure 9b    x ⟶

• IN

• OUT

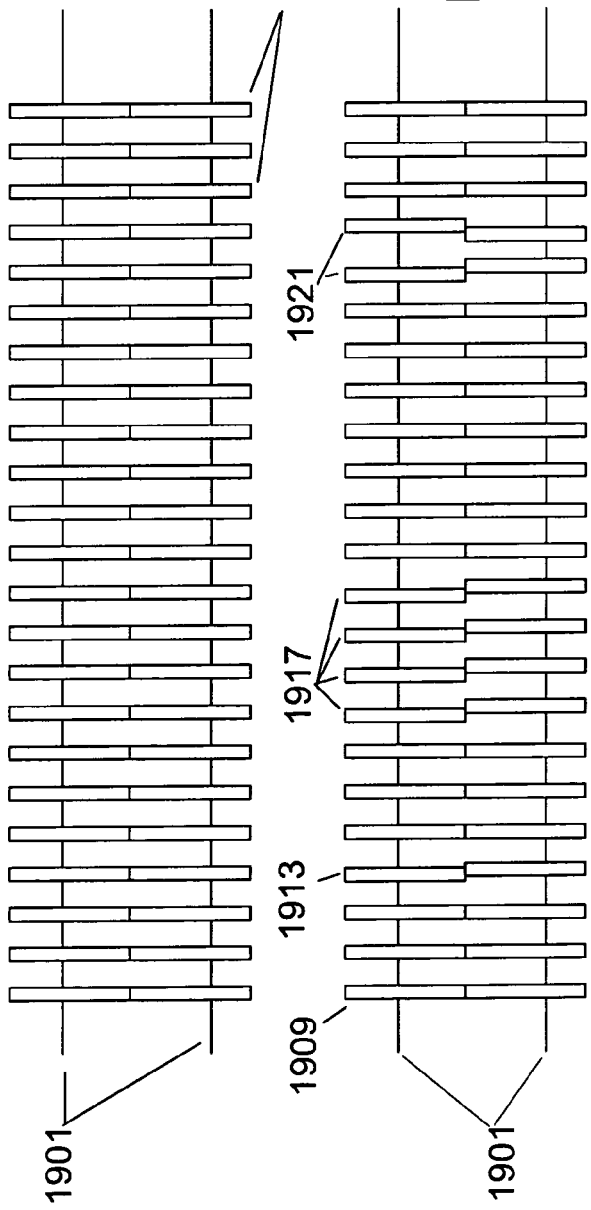
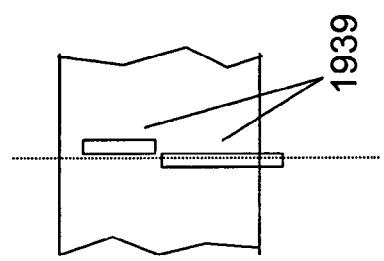
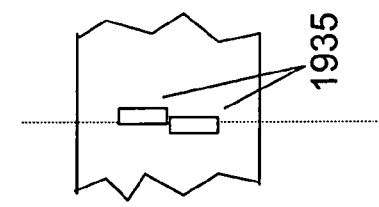
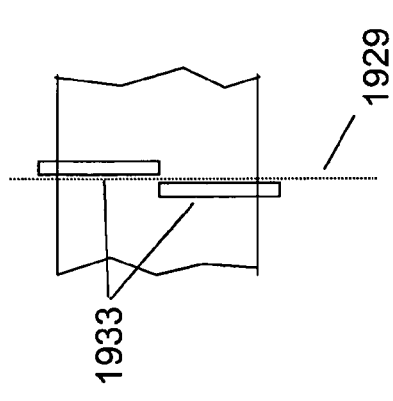

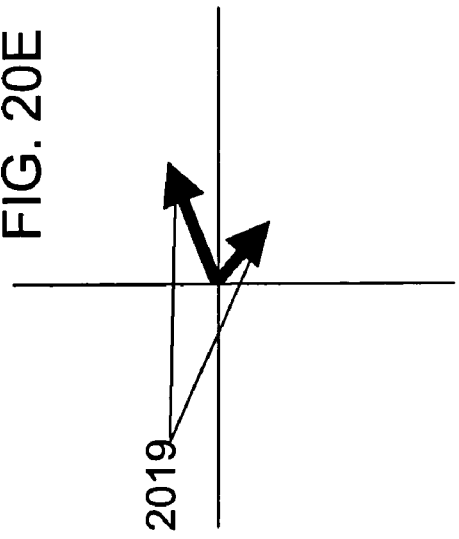
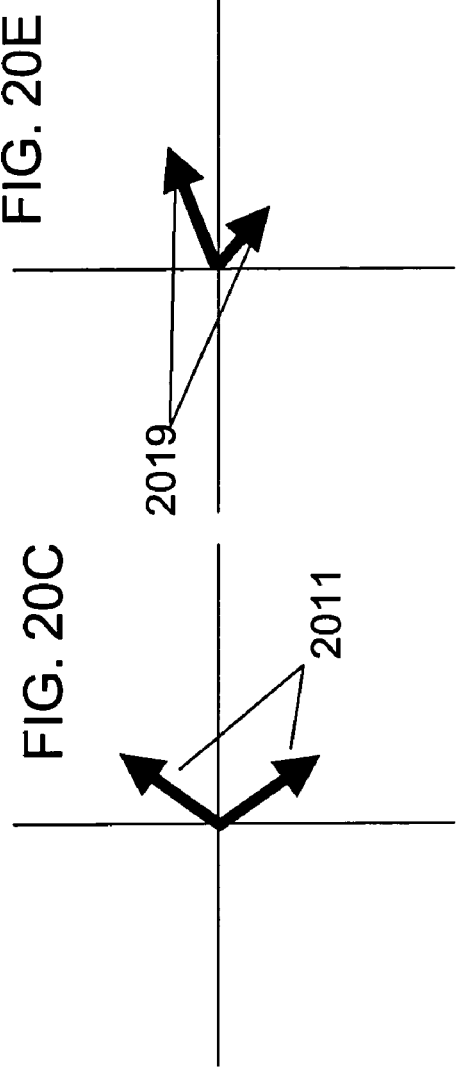
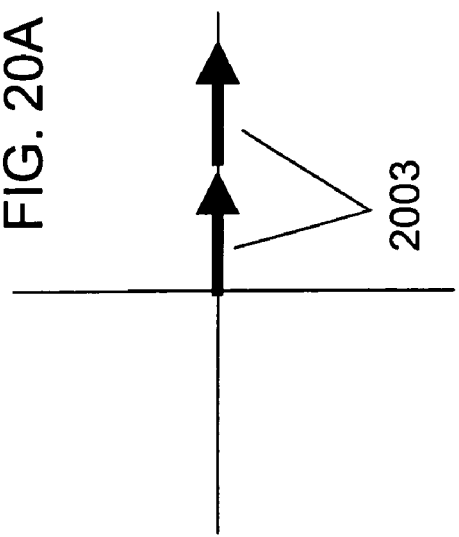
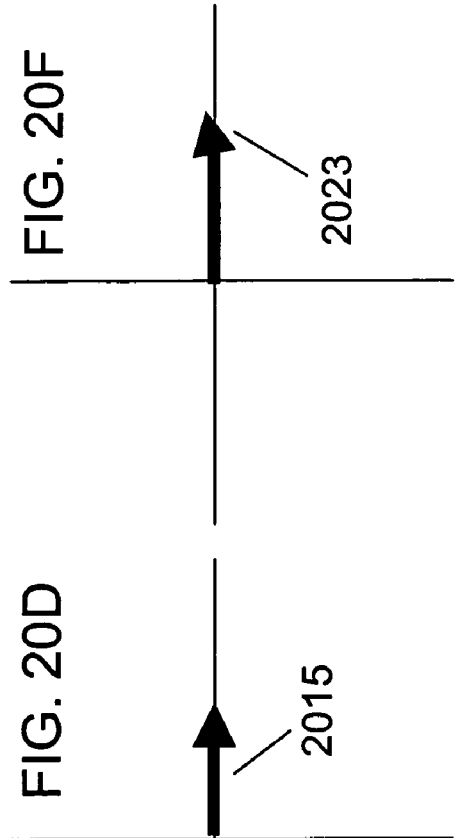
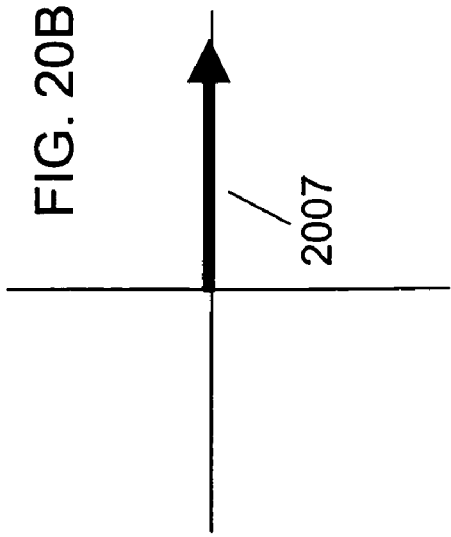

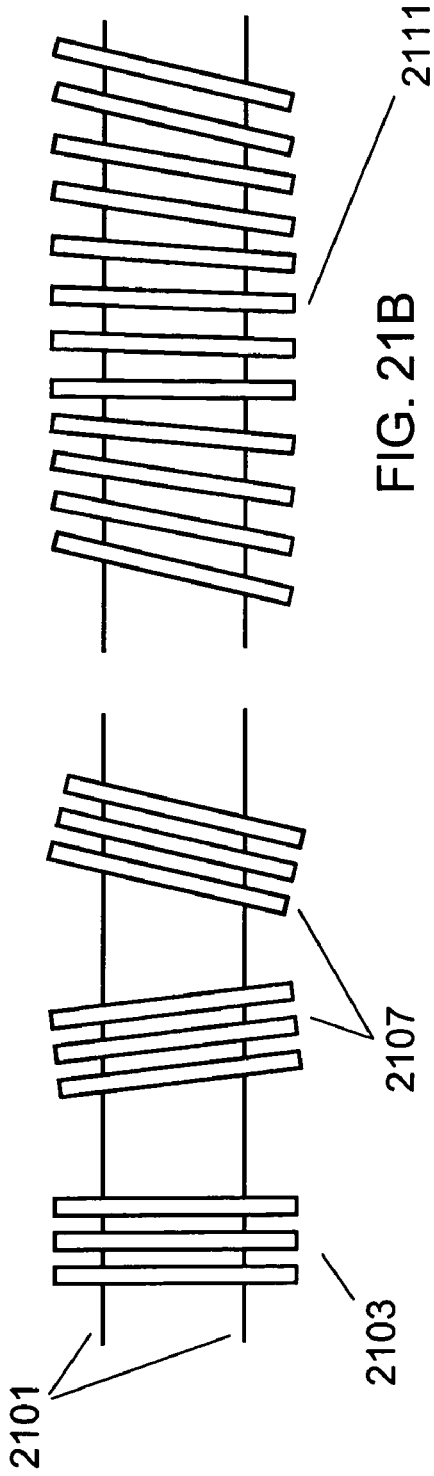
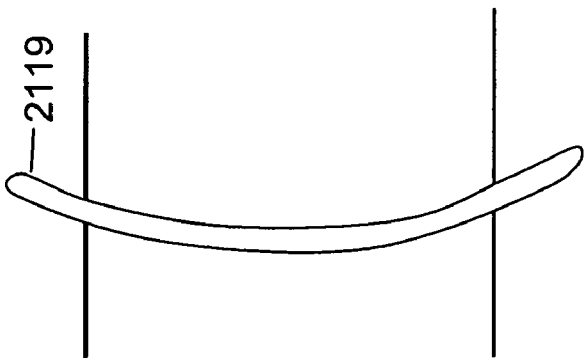
FIG. 21A  FIG. 21B
FIG. 22

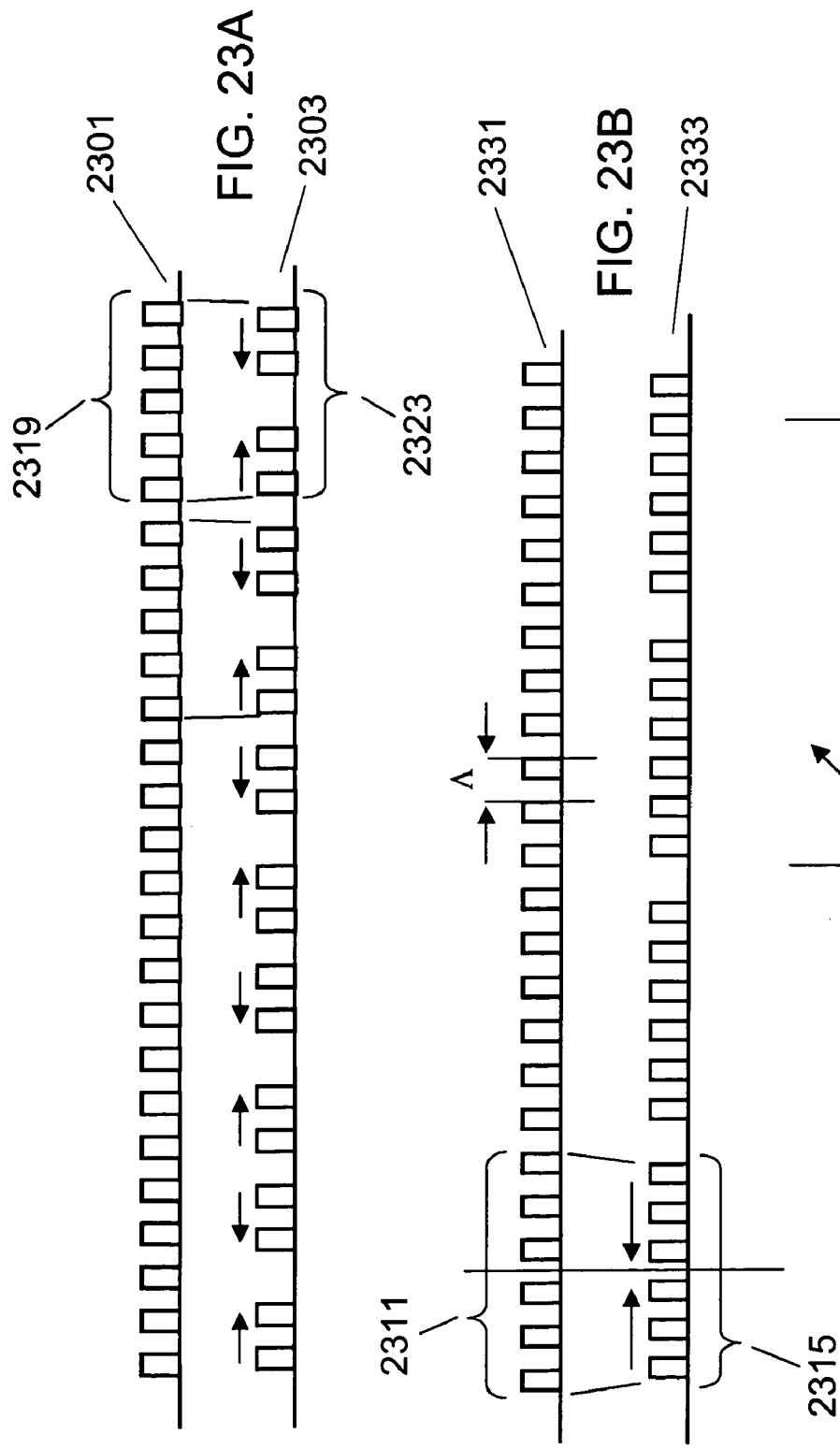

AMPLITUDE AND PHASE CONTROL IN DISTRIBUTED OPTICAL STRUCTURES

BENEFIT CLAIMS TO RELATED APPLICATIONS

This application is a continuation-in-part of U.S. non-provisional application Ser. No. 10/989,236 filed Nov. 15, 2004 (now Pat. No. 6,965,716), which a continuation of U.S. non-provisional application Ser. No. 10/653,876 filed Sep. 2, 2003 (now Pat. No. 6,829,417), which in turn claims benefit of U.S. provisional App. No. 60/468,479 filed May 7, 2003 and U.S. provisional App. No. 60/486,450 filed Jul. 10, 2003. Application Ser. No. 10/653,876 is also a continuation-in-part of U.S. non-provisional application Ser. No. 10/229,444 filed Aug. 27, 2002 (now Pat. No. 6,678,429), which in turn claims benefit of U.S. provisional App. No. 60/315,302 filed Aug. 27, 2001 and U.S. provisional App. No. 60/370,182 filed Apr. 4, 2002. Each of said provisional and non-provisional applications named hereinabove is hereby incorporated by reference as if fully set forth herein.

BACKGROUND

The field of the present invention relates to optical devices incorporating distributed optical structures. In particular, apparatus and methods are described herein for implementing amplitude and phase control in distributed diffractive optical structures.

Distributed optical structures in one-, two-, or three-dimensional geometries offer powerful optical functionality and enable entirely new families of devices for use in a variety of areas including optical communications, spectral sensing, optical waveform coding, optical waveform processing, and optical waveform recognition. It is important in the design of distributed optical structures to have means to control the amplitude and phase of the electromagnetic field diffracted by individual diffractive elements within the overall distributed structure. This invention relates to approaches for fabricating diffractive elements that provide flexible control over diffractive amplitude and phase.

A distributed optical structure typically includes a large number of individual diffractive elements. Each individual diffractive element may scatter (and/or reflect and/or diffract) only a small portion of the total light incident on the distributed structure. This may be because the individual diffractive elements subtend only a small fraction of available solid angle of the incident optical field in the interaction region, and/or because individual diffractive elements have a small reflection, diffraction, or scattering coefficient. Distributed optical structures in two or three dimensions can also be described as volume holograms since they have the capability to transform the spatial and spectral properties of input beams to desired forms.

There are many reasons why it is important to have control over the amplitude and/or phase of the portions of the field scattered by individual diffractive elements. For example, a distributed optical structure can act as a general spectral filter supporting a broad range of transfer functions. In the weak-reflection approximation, the spectral transfer function of a structure is approximately proportional to the spatial Fourier transform of the structure's complex-valued scattering coefficient—as determined by the amplitude and phase of the field scattered by individual diffractive elements (See: T. W. Mossberg, Optics Letters Vol. 26, p. 414 (2001); T. W. Mossberg, SPIE International Technology Group Newsletter, Vol. 12, No. 2 (November 2001); and the applications cited hereinabove). In order to produce a general spectral transfer function, it is useful to control the amplitude and phase of each constituent diffractive element. Application of the present invention provides for such control. Also, when multiple distributed structures are overlaid in the same spatial region, system linearity can only be maintained by ensuring that the diffractive strength of overlaid diffractive elements is the sum of the individual diffractive element strengths. When diffractive elements are lithographically scribed, overlaid structures will not typically produce a summed response. The approaches of the present invention provide means for modifying overlaid diffractive elements (formed by lithographic and/or other suitable means) so that each element negligibly affects another's transfer function.

SUMMARY

An optical apparatus according to the present invention comprises an optical element having a set of multiple diffractive elements. Each diffractive element diffracts a corresponding diffracted component of an incident optical field with a corresponding diffractive element transfer function. Collectively, the diffractive elements provide an overall transfer function between an entrance optical port and an exit optical port (which may be defined structurally and/or functionally). Each diffractive element includes at least one diffracting region modified or altered in some way so as to diffract, reflect, and/or scatter a portion of an incident optical field, and is spatially defined relative to a corresponding one of a set of diffractive element virtual contours. The virtual contours are spatially arranged so that, if the diffracting regions of the corresponding diffractive elements were to spatially coincide with the virtual contours, the resulting superposition of corresponding diffracted components at a design wavelength would exhibit maximal constructive interference at the exit port. The modification to form a diffracting region typically involves a differential between some optical property of the diffracting region relative to the corresponding average optical property of the optical element (effective index, bulk index, surface profile, and so forth).

The optical element may be a planar (2D) or channel (1D) waveguide, with optical field propagation substantially confined in at least one transverse dimension. In a waveguide, the diffracting regions are curvilinear segments having some alteration of an optical property relative to the waveguide. The optical element may be a 3D optical element enabling three-dimensional propagation of optical fields therein, with the diffracting regions being surface areal segments of surface contours within the volume of the optical element. The optical element may be a diffraction grating, the diffracting regions being segments of the grating lines or curvilinear grooves that are formed on the grating. These various distributed optical devices may define one or more ports, and may provide one or more spatial/spectral transfer functions between the one or more ports.

For a channel or planar waveguide, a 3D optical element, or a diffraction grating, the overall transfer function and/or at least one corresponding diffractive element transfer function is determined at least in part by longitudinal and/or angular displacement of at least one diffracting region relative to the corresponding virtual contour. For a planar waveguide, a 3D optical element, or a diffraction grating, the overall transfer function and/or at least one corresponding diffractive element transfer function is determined at least in part by: longitudinal and/or angular displacement of at least one diffracting region relative to the corresponding virtual contour; longitudinal displacement of at least one diffractive element relative to the corresponding virtual contour; and/or at least one virtual contour lacking a diffractive element corresponding thereto.

Various objects and advantages pertaining to distributed optical structures may become apparent upon referring to the preferred and alternative embodiments of the present invention as illustrated in the drawings and described in the following written description and/or claims.

BRIEF DESCRIPTION OF THE DRAWINGS

FIGS. 9a and 9b are schematic diagrams of distributed optical devices having constant and position-dependent density of diffractive elements, respectively.

FIGS. 19A-19E illustrate schematically channel waveguides with diffractive elements having longitudinal facet displacements.

FIGS. 20A-20F are phasor diagrams for the diffractive elements of FIGS. 19A-19E.

FIGS. 21A-21B illustrate schematically channel waveguides with diffractive elements angularly displaced.

FIG. 22 illustrates schematically a diffractive element in a channel waveguide.

FIGS. 23A-23B illustrate schematically diffractive element subsets having correlated longitudinal displacements.

FIGS. 24A-24B are phasor diagrams for the diffractive element subsets of FIGS. 23A-23B.

Figure 1:
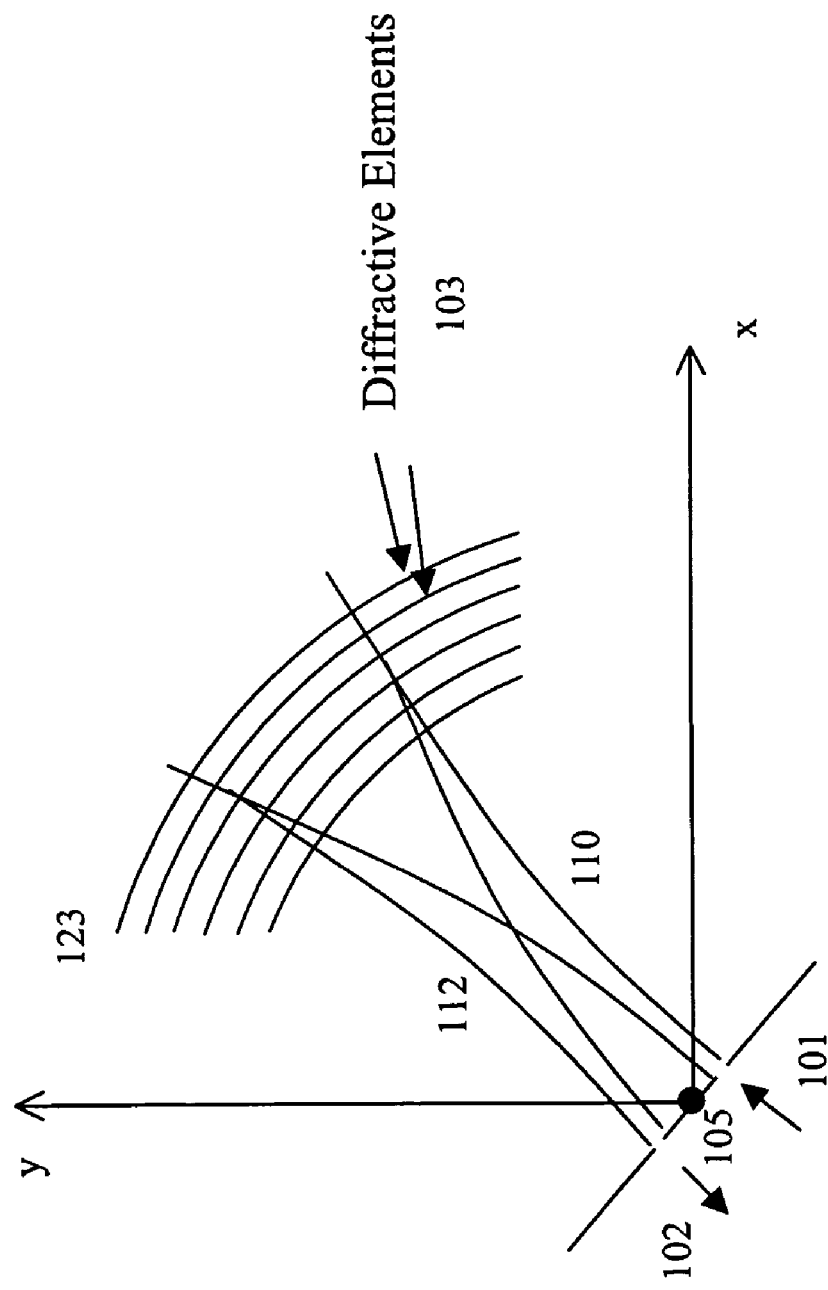
FIG. 1 is a schematic diagram of a distributed optical device implemented in a planar optical waveguide.

In the Figures, it should be noted that many of the embodiments depicted are only shown schematically, and that not all features may be shown in full detail or in proper proportion. Certain features or structures may be exaggerated relative to others for clarity. It should also be noted that the embodiments shown in the Figures are exemplary only, and should not be construed as specifically limiting the scope of the written description or the claims set forth herein.

The embodiments shown in the Figures are exemplary, and should not be construed as limiting the scope of the present disclosure and/or appended claims.

DETAILED DESCRIPTION OF EMBODIMENTS

Definitions

Distributed Optical Structure: A collection of two or more diffractive elements spanning a region of space that are collectively active to diffract, reflect, or redirect at least a portion of an input optical field, thereby creating an output field whose spectral and spatial properties differ from those of the input field in a manner determined by the structure of individual constituent diffractive elements and the detailed relative arrangement of the constituent diffractive elements. A holographic Bragg reflector (HBR) and a diffraction grating are examples of distributed optical structures. A distributed optical structure may also be referred to as a distributed diffractive optical structure, a distributed optical device, a distributed diffractive optical device, and so forth.

Diffractive Element: Generalization of a single line or groove in a standard surface-type diffraction grating. In general, a diffractive element may comprise one or more diffracting regions thereof (also referred to as diffracting segments or diffracting facets), the diffracting regions having one or more altered optical properties so as to enable diffraction (and/or reflection and/or scattering) of a portion of an incident optical field therefrom. Such optical property alterations may include: refractive index variations or modulations in, on, and/or near an optical element or a waveguide medium; trenches or grooves etched into one or more surfaces of an optical element or a waveguide structure (core and/or cladding); ribs extending out from one or more surfaces of an optical element or a waveguide structure (core and/or cladding); metallic, dielectric, multi-layer, and/or other coating elements in, on, or near an optical element or a waveguide structure (core and/or cladding); and/or other one or more altered optical properties in the interior, on the surface(s), or in the proximity of an optical element or a waveguide active to diffract, reflect, and/or scatter incident light. In one- or two-dimensional waveguide-based diffractive structures, diffractive elements may include generalized curves active to diffract, reflect, and/or scatter a portion of an incident optical field. In three-dimensional diffractive structures, diffractive elements may include generalized surfaces having one or more altered optical properties so as to diffract, reflect, and/or scatter a portion of an incident optical field. In diffraction-grating-type diffractive structures, diffractive elements may include grating lines and/or grooves (full and/or partial) having one or more altered optical properties so as to diffract, reflect, and/or scatter a portion of an incident optical field. A set of diffractive elements is spatially defined with respect to a set of diffractive element virtual contours.

Diffractive Element Virtual Contour Set: A set of virtual lines, curves, or surfaces that serve as a spatial reference for defining a set of diffractive elements. Most typically, a virtual contour set is arranged so that if the diffracting regions of the corresponding diffractive elements were to spatially coincide with the virtual contours, then the resulting superposition of corresponding diffracted components of an incident optical field at a design wavelength would exhibit maximal constructive interference at the exit port. A virtual contour set is a generalization of the set of uniformly spaced parallel lines that spatially define the grooves of a standard diffraction grating. It should be noted that the virtual contour set is not physically present in the distributed optical structure, but serves as a spatial reference for defining the diffractive elements of the distributed optical structure.

Field Amplitude: The peak value of an oscillatory field interactive with a distributed optical structure. Interactive fields may include input and output fields. Field amplitude may be a function of wavelength, position, and/or propagation direction.

Field Phase: The difference in oscillatory phase of an interactive oscillatory field compared to a reference oscillatory field as a function of wavelength, position, and/or propagation direction.

Diffractive Element Transfer Function: A function of wavelength, position, and/or propagation direction relating the field amplitude and field phase of an optical field diffracted, reflected, and/or scattered from a single diffractive element to the field phase and field amplitude of an optical field incident on the diffractive element.

Collective Transfer Function: Alternatively, distributed optical transfer function, overall transfer function, overall set transfer function, diffractive element set transfer function, device transfer function, port-to-port transfer function, and so forth. A function of wavelength, position, and/or propagation direction relating the field amplitude and field phase of an optical field diffracted, reflected, and/or scattered from a distributed optical structure (comprising two or more constituent diffractive elements) to the field phase and field amplitude of an optical field incident on the distributed optical structure. In the limit of weak diffraction by each element (so that multiple diffractions can be neglected), such a collective transfer function is typically a coherent superposition of the diffractive element transfer functions of the constituent diffractive elements. In cases where the diffraction by each element is sufficiently strong (so that multiple diffractions cannot be neglected), the relationship between the various element transfer functions and the collective transfer function will be more complicated.

Apodization function: A function relating amplitude and/or phase of an optical field diffracted, reflected, and/or scattered from a single diffractive element or a local subset of diffractive elements within a diffractive element set to the position of the element or subset within the diffractive element set along a propagation direction of the optical field. In general, a collective transfer function may be thought of as a coherent superposition of normalized, in-phase diffractive element transfer functions, with the apodization function providing the (in general) complex-valued coefficients of the superposition.

Planar Waveguide: Alternatively, a two-dimensional waveguide. Any transmissive structure of relatively large extent in two dimensions and relatively thin in a third dimension whose boundary reflection properties lead to substantial confinement of certain optical fields propagating nearly parallel to the structure's extended directions (i.e., substantial confinement in one transverse dimension). A planar waveguide may be flat or curved according to whether the thin dimension corresponds to a substantially fixed spatial direction or a position-dependent spatial direction, respectively.

Channel Waveguide: Alternatively, a one-dimensional waveguide. Any transmissive structure of relatively large extent in one dimension and relatively thin in the remaining two dimensions whose boundary reflection properties lead to substantial confinement of certain fields propagating nearly parallel to the structure's single extended direction (i.e., substantial confinement in two transverse dimensions). A channel waveguide may be straight or curved according to whether the thin dimensions correspond to substantially fixed spatial directions or position-dependent spatial directions, respectively.

Fill Factor: A number between 0 and 1 representing the fraction of a predefined line, curve, surface, and/or other virtual contour that is marked, scribed, or otherwise altered in some manner to form one or more diffracting regions. For a curvilinear virtual contour, the fill factor may be determined by the sum of the lengths of all altered (i.e., diffracting) segments of the virtual contour divided by the total virtual contour length. For a surface virtual contour, the fill factor may be determined by the sum of the surface areas of all altered (i.e., diffracting) surface areal segments of the virtual contour divided by the total virtual contour surface area.

Fill Distribution: a function of position on a virtual contour indicating whether a given point on the virtual contour has been altered or not to form a diffracting region. Integrated over an entire virtual contour, the fill distribution would yield the fill factor (see above). Integrated over a region of the virtual contour, the fill distribution may be interpreted as defining a "local fill factor" for the region.

Optical Port: A structurally and/or functionally defined region of space through which an optical field enters or exits an optical device, characterized by position and/or propagation direction. For example, incident and diffracted angles relative to a diffraction grating would be an example of a functionally-defined optical port defined by propagation direction, while an end face of a channel waveguide would be an example of a structurally-defined optical port defined by position. A given optical device may have one or more ports, and any given port may function as an entrance optical port, an exit optical port, or both.

Exemplary Diffractive Element Geometries

Consider the substantially flat exemplary planar waveguide structure shown in FIG. 1. A plane containing one boundary (upper or lower) of the planar waveguide is spanned by the x and y coordinates. The waveguide structure occupies a certain region of the xy plane and has a thickness $\Delta z$ which is substantially constant except for thickness variations that may be associated with diffractive elements. The thickness $\Delta z$ is typically 4 to 8 times the in-medium design wavelength of the device but can be less (provided that propagating waveguide field modes are nevertheless supported by the planar waveguide) or greater (provided that modal dispersion does not appreciably broaden the spectral response of relevant distributed optical structures). At typical telecommunication wavelengths ($\lambda_{air} \sim 1.5$ μm), the thickness of the planar waveguide may be about 6 μm if the waveguide medium is silica. In the exemplary embodiment of FIG. 1, light enters the planar waveguide through optical port 101 (via a channel waveguide, edge mounted fiber, surface grating coupler, free space propagation, or any other suitable optical input means), propagates within the planar waveguide (in this example expanding in region 110), encounters distributed optical structure 123, and diffracts from diffractive elements 103. The diffractive elements 103 are positioned and adapted so that diffracted light in region 112 possesses field amplitude/phase well-suited for transmission through optical port 102, through which light may exit the device and propagate away (by free space propagation or propagation through a channel waveguide, butt-coupled fiber, surface grating coupler, or any other suitable optical coupling device). The virtual contours of individual diffractive elements 103 in the xy plane may preferably chosen so as to collectively transform the field amplitude/phase of the input signal to be optimally suited for transmission through output port 102. The diffractive elements, considered collectively, comprise a hologram with powerful field amplitude/phase mapping and/or spectral filtering capability through the collective transfer function of distributed optical structure 123. The diffractive elements 103 are shown in this example as simple circular arcs having a common center 105, which is approximately midway between the optical ports 101 and 102. Circular arcs may not necessarily provide optimal mapping of the input field amplitude/phase onto the output optical port. More generally, the diffractive elements 103 may comprise virtual contours more complex than simple conic sections.

Figure 2:
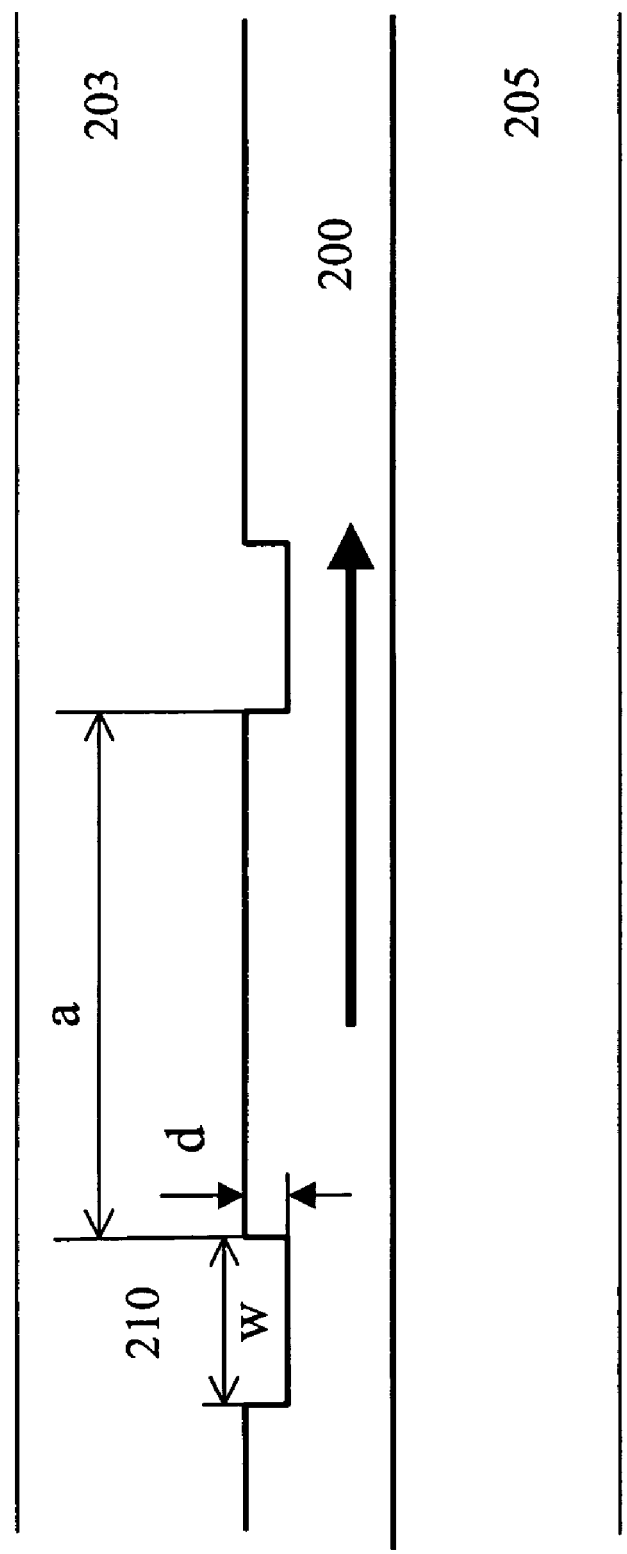
FIG. 2 is a cross-sectional view of a pair of individual diffractive elements of a distributed optical device.

An enlarged cross sectional view of an exemplary planar waveguide structure including two of the individual diffractive elements is shown in FIG. 2. The cross sectional plane of FIG. 2 is parallel to the z direction and contains the point 105 in FIG. 1. In FIG. 1, the actual structure of the diffractive elements is not resolved and they appear simply as lines 103. In the exemplary case of FIG. 2, the diffractive elements comprise trenches etched or otherwise scribed into one surface of the planar waveguide core 200. Typically, but not necessarily, the region above and below the waveguide core 200 is filled with a transparent dielectric material, upper cladding 203 and lower cladding 205, having an index of refraction that is smaller than that of core 200. Input fields incident on the distributed optical structure are primarily localized in the core 200. Alternatively, the diffractive elements may comprise: bulk index of refraction changes in the core and/or cladding layers; index of refraction variations, modulations, and/or discontinuities created internal to the planar waveguide during fabrication by lithographic or other means; rib-like structures extending from the waveguide plane, including in the limit of very short ribs metallic and/or dielectric coating elements; and/or any structural element active to diffract, reflect, and/or scatter a portion of the input field.

A diffractive element trench shown, 210, has a width w and a depth d in the planar waveguide core 200. It would be useful to have the ability to independently vary the depth of the various diffractive elements (and/or the shapes of the trenches) since such ability would provide for independent control of the relative diffractive amplitudes of the individual diffractive elements (i.e., control of the amplitude apodization function). However, depth/shape control within a single distributed optical structure creates significant fabrication challenges. Similarly, heights/shapes of protruding ribs or the magnitudes/profiles of index modulations could also provide diffracted amplitude control for individual diffractive elements, but also introduce significant fabrication challenges.

The present invention includes apparatus and methods for controlling the diffractive scattering amplitude and/or phase of individual diffractive elements (i.e.; control of the apodization function), while mitigating fabrication difficulties. A preferred technique is referred to herein as partial-fill gray scale. Another preferred technique is referred to herein as width-based gray scale. Another preferred technique is referred to herein as proportional-line-density gray scale. Another preferred technique is referred to herein as facet-displacement gray scale. Another preferred technique is referred to herein as element-displacement gray scale. Some aspects of these techniques have been disclosed in above-cited: provisional App. No. 60/315,302 by Mossberg; provisional App. No. 60/370,182 by Mossberg and Greiner; non-provisional application Ser. No. 10/229,444 by Mossberg and Greiner; provisional App. No. 60/468,479 by Greiner, Iazikov, and Mossberg; and provisional App. No. 60/486,450 by Greiner, Iazikov, and Mossberg. It should be noted in the ensuing discussion that any references to partial scribing of trench- or groove-like diffractive elements may be equivalently applicable to partial fabrication, alteration, and/or impression of protruding, rib-like, index-modulated, and/or other types of diffractive elements.

Partial-Fill Gray Scale

The instantaneous output signal generated at a particular position by a distributed optical structure such as that shown in FIG. 1 contains contributions from the light scattered from each point along the length of each diffractive element. The net contribution made by a particular diffractive element to the output signal at a particular time and position may be regarded to be the spatial integral of the product of the diffractive element amplitude at each point along its virtual contour and the amplitude of the input field that was incident on the diffractive element point a propagation time earlier. In computing the aforementioned integral, optical phase must be taken into account. In cases where all points on a diffractive element virtual contour contribute with essentially the same phase, as for example at the output port 102 in FIG. 1, the integral nature of the diffractive element contribution to the output field allows amplitude control from an individual diffractive element through control of the fraction of the nominally continuous virtual contour that is actually scribed, index-modulated, fabricated, or otherwise altered to form one or more diffracting regions. In situations where various points along a diffractive element virtual contour contribute with position-dependent phases, the net amplitude of the diffractive element may still be controlled by selectively altering only portions of the diffractive element virtual contour to form one or more diffracting regions. In such cases, however, the relationship between amplitude and fill factor (of the alteration) becomes more complex and detailed consideration of the destructive or constructive nature of the contribution from each virtual contour point must be taken into account.

Figure 3:
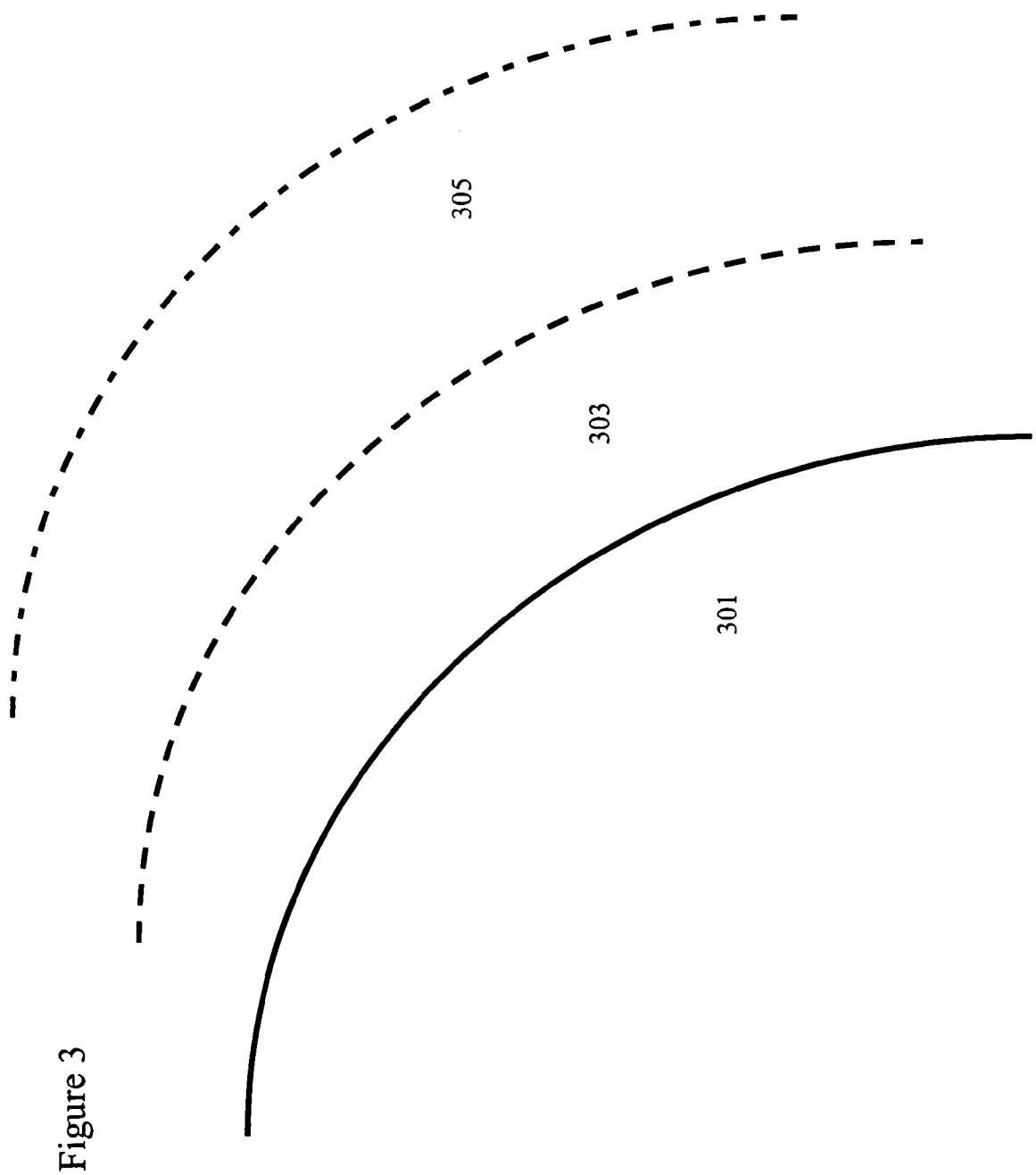
FIG. 3 illustrates schematically diffractive elements having differing fill factors.

FIG. 3 exemplifies diffractive element amplitude control by partial virtual contour scribing in the case that the entire virtual contour contributes to the output signal with essentially constant phase. In FIG. 3, three different diffractive elements having similar virtual contours but with three different fill factors and/or distributions are depicted. In diffractive element 301, 100 percent of the diffractive element virtual contour is altered (as indicated by the continuous dark line) by creating a trench, for example. In diffractive element 303, portions of the diffractive element virtual contour are not scribed (indicated by the breaks in the dark line). The net amplitude of diffractive element 303 compared to that of diffractive element 301 is given by the ratio of their integrated contributions to the output signal. Ignoring spatial variations in the input signal, the relative diffractive amplitudes of elements 301 and 303 are in proportion to their fill factors (i.e., in proportion to the fraction of the virtual contour altered to form one or more diffracting regions). The exact ratio of the diffractive amplitudes of the elements is influenced by the spatial variation of the input field and is given by the ratio of the integrals of diffractive element amplitude multiplied by local input field amplitude along the respective diffractive element virtual contours. When the diffractive elements are finely divided into many diffracting regions so that the input field amplitude is relatively constant over successive virtual contour portions, the relative diffractive element amplitudes are reasonably approximated simply by the fill factors of respective diffractive elements.

Diffractive element 305 has yet a different fill distribution and factor. By controlling the fraction of a given diffractive element virtual contour that is scribed or otherwise written with a trench, rib, or other scattering mechanism to form one or more diffracting regions, one can continuously control the effective amplitude of the diffractive element, thereby enabling realization of virtually any desired amplitude apodization function. Note that partial scribing of the diffractive element virtual contour provides effective amplitude control without changing diffractive element height/depth, cross-section, shape, or structure. If etched trenches or ribs are utilized as diffractive elements, partial diffractive element virtual contour filling provides a means of achieving control over diffractive element amplitude without requiring control over etch depth or width, thereby vastly simplifying fabrication. Trenches or ribs of fixed cross-section can be written or not written in binary fashion along the diffractive element virtual contour, which is easily accomplished with standard lithographic techniques. Control of etch depth to different levels on a single planar waveguide to control diffractive element amplitude is lithographically challenging. Partial-fill gray scale provides a solution to diffractive element amplitude control that does not require etch depth variation within the distributed optical structure. Controlled variation of etch depth may nevertheless be used in combination with partial-fill gray scale. It should be noted that fill patterns used in the control of net diffractive element amplitude may include randomness in order to suppress constructive interference in undesired output areas. If the fill pattern is regular, cases may arise where grating type effects lead to undesired output signal orders. However, such additional output signal order from a regular fill pattern may be exploited for providing additional device functionality.

The partial-fill gray scale apparatus and methods according to the present invention may be employed in any diffractive device or structure where output signals derive from extended sources either in the form of a curvi-linear virtual contour or a surface virtual contour. Partial population (i.e., partial filling) of the virtual contour with a scattering, reflecting, or diffracting mechanism to form one or more diffracting regions provides a simple approach to controlling the relative output amplitude from that virtual contour compared to other virtual contours (controlling the amplitude apodization function on an element-by-element basis). Partial-fill gray scale may be implemented with smoothly varying diffractive element amplitude as well as binary scribing and non-scribing.

Figure 4:
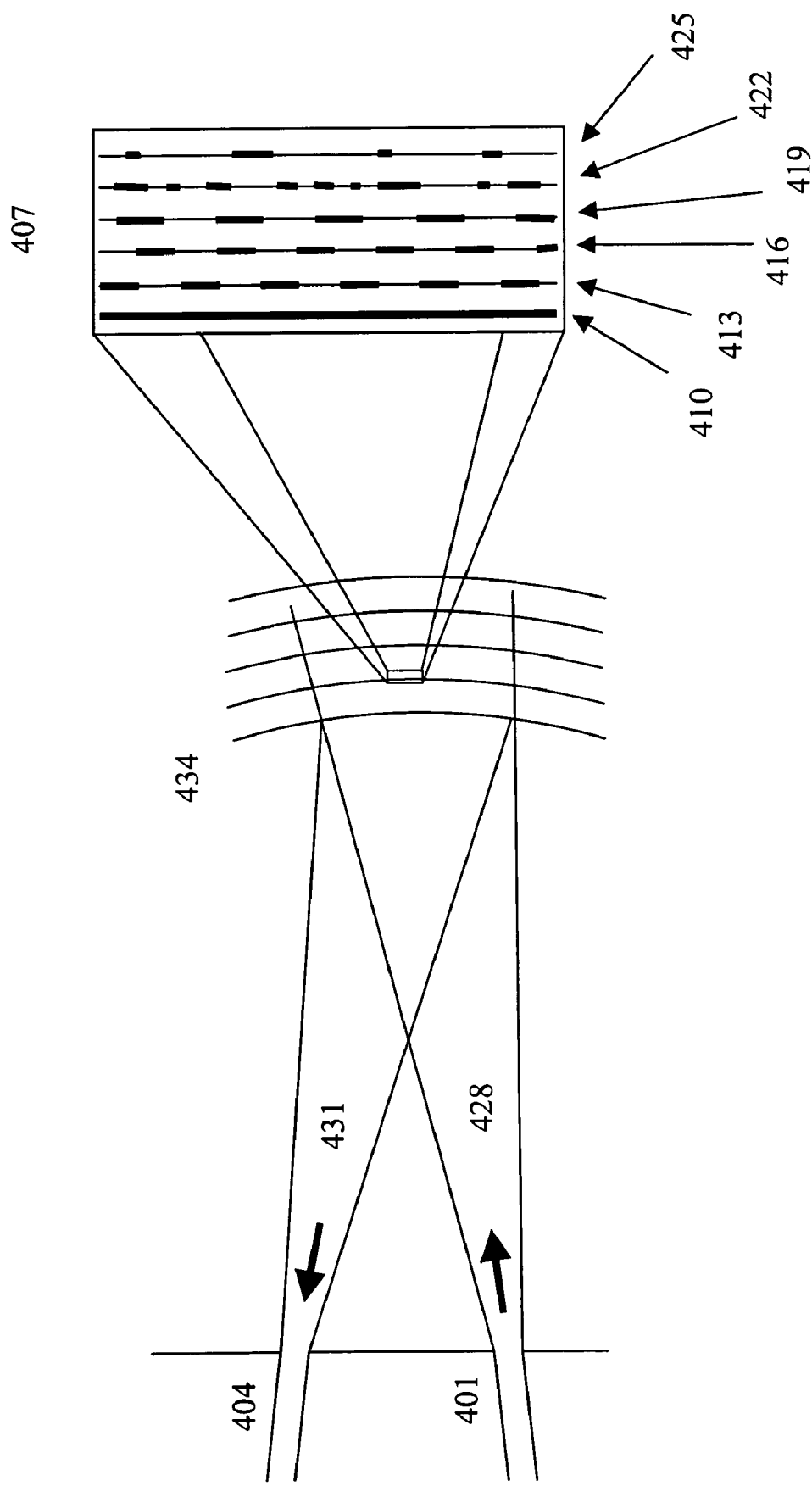
FIG. 4 is a schematic diagram of a two-port distributed optical device implemented in a planar optical waveguide.

FIG. 4 shows an exemplary embodiment of the present invention comprising a two-port planar waveguide. In this example, partial-fill gray scale is used to create diffractive elements of various effective amplitudes in a planar waveguide two-port filter device. FIG. 4 is a top view of the two-port planar waveguide device and fields propagate substantially within the plane of the Figure. Light may enter the device through an input port 401 (from an input channel waveguide in this example) and expands in region 428 of the planar waveguide before encountering distributed optical structure 434. Distributed optical structure 434 comprises two or more diffractive elements, typically many diffractive elements (potentially ranging between 2 elements and $10^6$ elements; on the order of $10^3$-$10^4$ elements may be employed in typical devices). Individual diffractive elements are too small to be seen in the overall view of the distributed optical structure and typically have a separation of an integer number of half wavelengths of a reflected field (wavelength inside the planar waveguide medium). The diffractive elements collectively generate an output signal which converges through region 431 of the planar waveguide and exits the device through output port 404 (into an output channel waveguide in this example). The spatial patterning of the diffractive element virtual contours in the distributed optical structure may be configured for generating an output signal spatially well-matched to the output port 404. An enlarged diagram, 407, showing individual diffractive elements within the distributed optical structure is also shown. In this exemplary embodiment where the input signal is optical radiation of vacuum wavelength 1.54 microns, the diffractive elements consist of trenches of about 0.25 micron width and 0.4 micron depth etched into one surface of the planar waveguide core using standard lithographic techniques. The planar waveguide of the exemplary embodiment may comprise silica-based core and cladding layers, but may alternatively consist of polymer, silicon, III-V semiconductors, other semiconductors, or any other suitable medium transmissive to the input field employed.

Individual diffractive element virtual contours are preferably configured to optimally direct a portion of the incident optical field onto the output port. To control relative diffractive amplitudes of the individual elements, differing fractions and distributions of each of the diffractive element virtual contours are scribed with trenches to form one or more diffracting regions. Virtual contour 410 corresponds to a diffractive element that has maximal (unity) relative amplitude and is therefore scribed with a trench over its entire length. Virtual contours 413, 416, 419, and 422 all correspond to diffractive elements having relative amplitude of about 0.5. In each case, 50 percent of the virtual contour length is scribed with a trench. The length of individual scribed segments (i.e., diffracting regions) is widely variable, a lower limit being determined primarily by lithographic resolution and an upper limit being determined primarily by the input field width. However, dependence of individual diffractive element amplitude on the input field spatial distribution can be avoided by employing a number of diffracting segments across the input beam width comparable or greater than the number of gray scale resolution levels desired (e.g. at least 50 scribed or unscribed segments to achieve 50-level gray scale).

Additional aspects applicable to the present invention are apparent from more detailed consideration of diffractive elements 413, 416, 419, 422, and 425. It will be noted that diffractive elements 413 and 416 are scribed with substantially identical regular patterns, having substantially equal-length segments of scribed and unscribed virtual contour segments (resulting in a fill factor of about 0.5). It will be further noted that the scribed segments (i.e., diffracting regions) of diffractive element 416 are laterally displaced from those of diffractive element 413. Considering diffractive elements 413 and 416 together, their combined scribed sections essentially uniformly span the transverse extent of the input field. Implementations of the present invention may typically ensure that any given portion of the input field spatial distribution "sees" about the same number of scribed (or otherwise diffracting, reflecting, and/or scattering) segments as it propagates into distributed optical structure 434, by including suitably laterally offset scribed portions of the diffractive element virtual contours. Such usage of partial-fill gray scale may ensure that the scribed portions of the set of diffractive elements comprising the distributed optical structure essentially uniformly span the transverse spatial distribution of the input field. Such arrangement of scribed diffracting segments may substantially reduce insertion loss by reducing the fraction of the input field distribution that may propagate through the distributed optical structure without interaction with a scribed diffractive element segment. Such arrangement of scribed sections is of lessening importance as the size of gaps between scribed sections decreases. With smaller gaps between scribed sections, diffraction begins to couple the input field into shadowed regions behind scribed sections of diffractive elements.

Diffractive element 419 also has a fill factor of about 0.5 (i.e. trenches are scribed on about 50 percent of the diffractive element virtual contour, and, like diffractive elements 413 and 416, has spaces and trenches of substantially equal length). However, the scribed and unscribed segments of diffractive element 419 are of a different length than is the case for elements 413 and 416 (i.e. element 419 has a fill pattern of a different periodicity). Such a mixture of trench fill patterns having differing periodicities is advantageous as a means for reducing coherently scattered light in unwanted output directions. Conversely, ordered arrays of diffractive elements having the same periodicity may be employed for generating multiple output signals through multiple output ports through coherent scattering. Diffractive element 422 illustrates an alternative means for reducing coherent scatter in unwanted output directions. The trenches comprising diffractive element 422 have irregular lengths and separations, while maintaining an overall fill factor of about 0.5. The irregular fill pattern minimizes coherent scattering in unwanted output directions. As a final example, diffractive element 425 has a fill factor of about 0.2 and an irregular fill pattern. The relative diffractive amplitude of element 425 is approximately 0.2.

It may be desirable to vary the fill factor along a given virtual contour (i.e., vary the local fill factor), thereby varying the diffracted amplitude as a function of position along the virtual contour. This additional degree of freedom may be exploited, for example, to flatten out a non-uniform incident field distribution. An incident field distribution with relatively larger amplitude in the center and relatively smaller amplitude at the periphery, for example, may be transformed into a more uniform field amplitude distribution by diffractive elements having smaller fill factors near the center and larger fill factors near the periphery. Other such scenarios may be readily implemented.

Diffractive elements need not be trenches. They may be any structural element, constituent, and/or optical property alteration active to diffract, reflect, and/or scatter a portion of the input field and may comprise trenches, ribs, or other suitable type of refractive index variation on or near one or both of the waveguide surfaces, and/or within the waveguide interior. Suitable diffractive elements may comprise: bulk index of refraction changes in the core and/or cladding layers; index of refraction variations, modulations, and/or discontinuities created internal to the planar waveguide during fabrication by lithographic or other means; groove- or trench-like structures in, on, or near the waveguide; rib-like structures extending from the waveguide plane, including in the limit of very short ribs metallic and/or dielectric coating elements; and/or any structural element active to diffract, reflect, and/or scatter a portion of the input field. The present invention may be implemented with continuous variations in local diffractive element amplitude rather than the discrete variations described in this exemplary embodiment.

Figure 5:
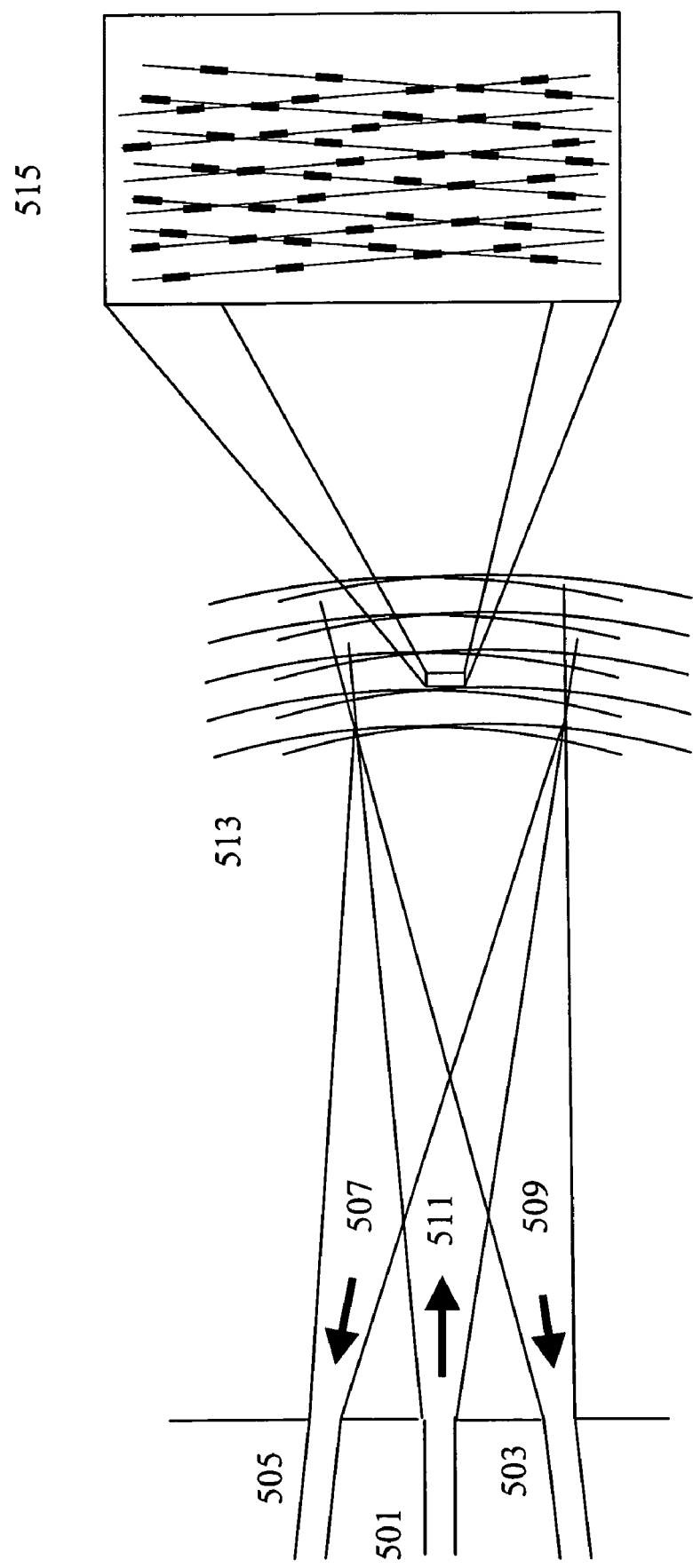
FIG. 5 is a schematic diagram of a three-port distributed optical device implemented in a planar optical waveguide.

A three-port exemplary embodiment of the present invention is depicted in FIG. 5. In this embodiment, partial-fill gray scale construction of diffractive elements is employed in the fabrication of a planar waveguide dual-component distributed optical structure which is comprised of two distributed optical structures (implemented as described hereinabove), each of which provides a separate spatial and spectral transfer function. In the embodiment of FIG. 5, an input field enters via input port 501 (through a channel waveguide, butt-coupled fiber, or any other suitable coupling means). The input field expands in region 511 of the planar waveguide and encounters the dual-component distributed optical structure 513. The dual-component distributed optical structure consists of two separate sets of diffractive elements, a first component set and a second component set. The first set of diffractive elements directs light from the input field to create a first output field which propagates through region 509 to a first output port 503, which may be any suitable type of output port. The first output field is related to the input field via a first spatial and spectral transfer function characteristic of the first component set of diffractive elements. The second set of diffractive elements directs light from the input field to create a second output field which propagates through region 507 and exits through output port 505, which may be any suitable type of output port. The second output field is related to the input field via a second spatial and spectral transfer function characteristic of the second set of diffractive elements. The first and second set of diffractive elements will generally overlap in some regions of the distributed optical structure.

The transfer functions of the first and second distributed optical structures are each preferably arranged so as to be substantially unaffected by the presence of the other distributed optical structure. This would typically not be the case if written segments of diffractive element virtual contours from each of the structures overlap. To avoid alteration of the transfer functions of the two sets of diffractive elements in regions where they overlap, some or all of the diffractive element virtual contours are preferably written with a fill factor less than unity, and the written segments (i.e., diffracting regions) arranged so as not to overlap one another. This is illustrated in the enlarged portion of FIG. 5, where diffractive elements 515 are shown having a fill factor of about 0.25. By suitably positioning written segments of the diffractive elements to substantially avoid overlap, the spectral and spatial transfer function of the first set of diffractive elements exhibits essentially the same form it would have in the absence of the second set of diffractive elements and likewise for the spatial and spectral transfer function of the second set of diffractive elements. Additional sets of diffractive elements active to couple the input port to additional output ports with characteristic spatial and spectral transfer functions may be additionally overlaid. The average fill factor of each set of diffractive elements is preferably adjusted as necessary to substantially eliminate overlap of written virtual contour segments. Partial-fill grayscale according to the present invention provides for the variation of relative diffractive element amplitude within a particular set of overlaid diffractive elements. Maximal diffractive element amplitude within a set of diffractive elements is preferably assigned a partial-fill factor that is less than unity by an amount sufficient to substantially reduce or eliminate overlap of written virtual contour segments. Other diffraction elements within the set having smaller amplitudes are assigned proportionally smaller fill factors.

Figure 6:
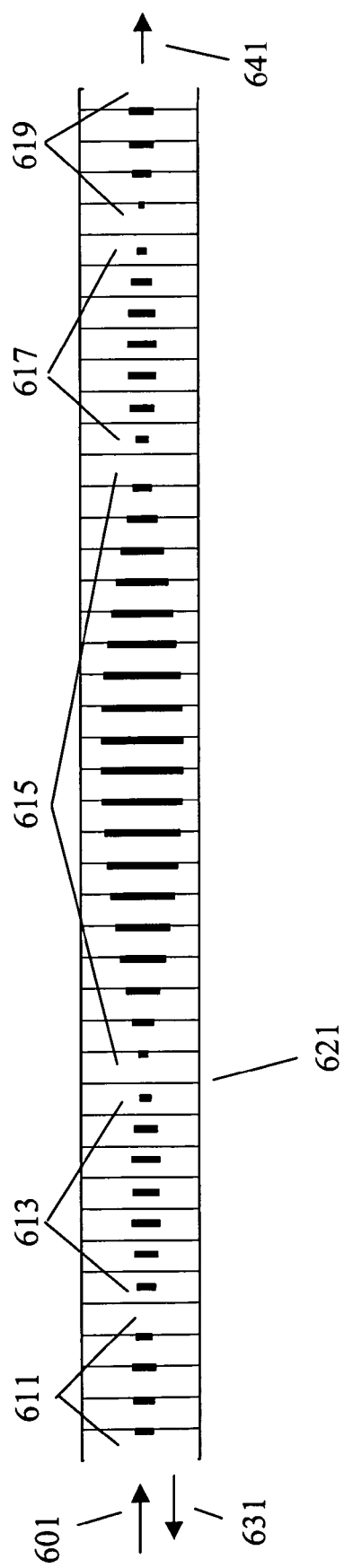
FIG. 6 is a schematic diagram of a distributed optical device implemented in a channel optical waveguide.

In channel waveguides, the diffractive elements comprising distributed optical structures are typically shorter (in transverse extent) since the input beam is confined in both transverse dimensions. The partial-fill gray-scale approach to controlling relative diffraction element amplitude may nevertheless be employed in a channel waveguide. An exemplary implementation of the present invention in a channel waveguide is schematically represented in FIG. 6, which shows a portion of a channel waveguide containing a distributed optical structure where partial-fill grayscale has been employed for relative diffractive element amplitude control. Input fields propagate from an input port 601 at the left end of the waveguide and encounter the distributed optical structure. The interaction of the input field with the distributed optical structure may generate a transmitted output field propagating forward through output port 641, and/or a back-reflected output field propagating backward through output port 631 (equivalent to input port 601 in this example). The channel waveguide is shown with a set of substantially uniformly spaced reference lines 621, which are preferably separated by one half of an in-guide reflected wavelength that would be produced by a distributed optical structure comprised of diffractive elements coincident with the reference lines.

The written segments (i.e., diffracting regions) of groups 611, 613, 615, 617, and 619 comprise the diffractive elements of the distributed optical structure. The diffractive elements may comprise any structural element, constituent, and/or alteration active to scatter a portion of the input field, and may specifically comprise trenches or ribs or other refractive index discontinuities or alterations in and/or near the channel waveguide boundaries and/or its interior, including diffractive elements recited elsewhere herein. The relative amplitudes of the various diffractive elements shown in FIG. 6 are controlled by varying their transverse extents to follow an approximate sinc function (i.e., sin(x)/x). However, the present invention is in no way limited to any specific pattern of diffractive element amplitude variation. Negative values of the sinc function are accommodated by introducing a spatial shift in the longitudinal position of the corresponding diffractive elements. Diffractive elements 613 and 617 therefore represent negative regions of the sinc function and are shifted by one half of the reference line spacing (i.e., one-quarter of the in-guide wavelength of the reflected wavelength). More generally, arbitrary relative phase shifts between the diffractive elements (i.e., a phase apodization function) may be achieved by introducing longitudinal position shifts (using the linear relationship between spatial and phase shifts given by 180 degrees per quarter in-guide wavelength). Stated another way, the relative phase of the signal generated by an individual diffractive element may be phase shifted by an amount $\phi$ radians by keeping all aspects of the diffractive element the same and shifting its center by an amount $\Delta a = (\lambda/4\pi n_1)\phi$, where $\lambda$ is the operative free-space wavelength and $n_1$ is the effective waveguide refractive index.

This approach to phase shifting applies generally to any distributed optical structure, and is not limited to channel waveguides. In this channel waveguide exemplary embodiment, partial-fill grayscale is implemented by writing each diffractive element as a single written segment (i.e., diffracting region) whose written length (i.e., transverse extent) is controlled. More generally, each diffractive element may include multiple written segments or single written segments with spatially varying local amplitude. The relative amplitude of each diffractive element is determined by two factors. One is the integrated product of the local diffractive element amplitude times the local input field amplitude integrated over the length of the diffractive element. Since the input field will typically vary significantly across the channel waveguide, such variation need be taken into account in choosing the transverse extent of diffracting region(s) along the diffractive elements. An additional factor controlling the relative diffractive element amplitude as it pertains to the back reflected field is the overlap integral between the element's back-diffracted field and the back-directed mode of the waveguide.

Figure 7:
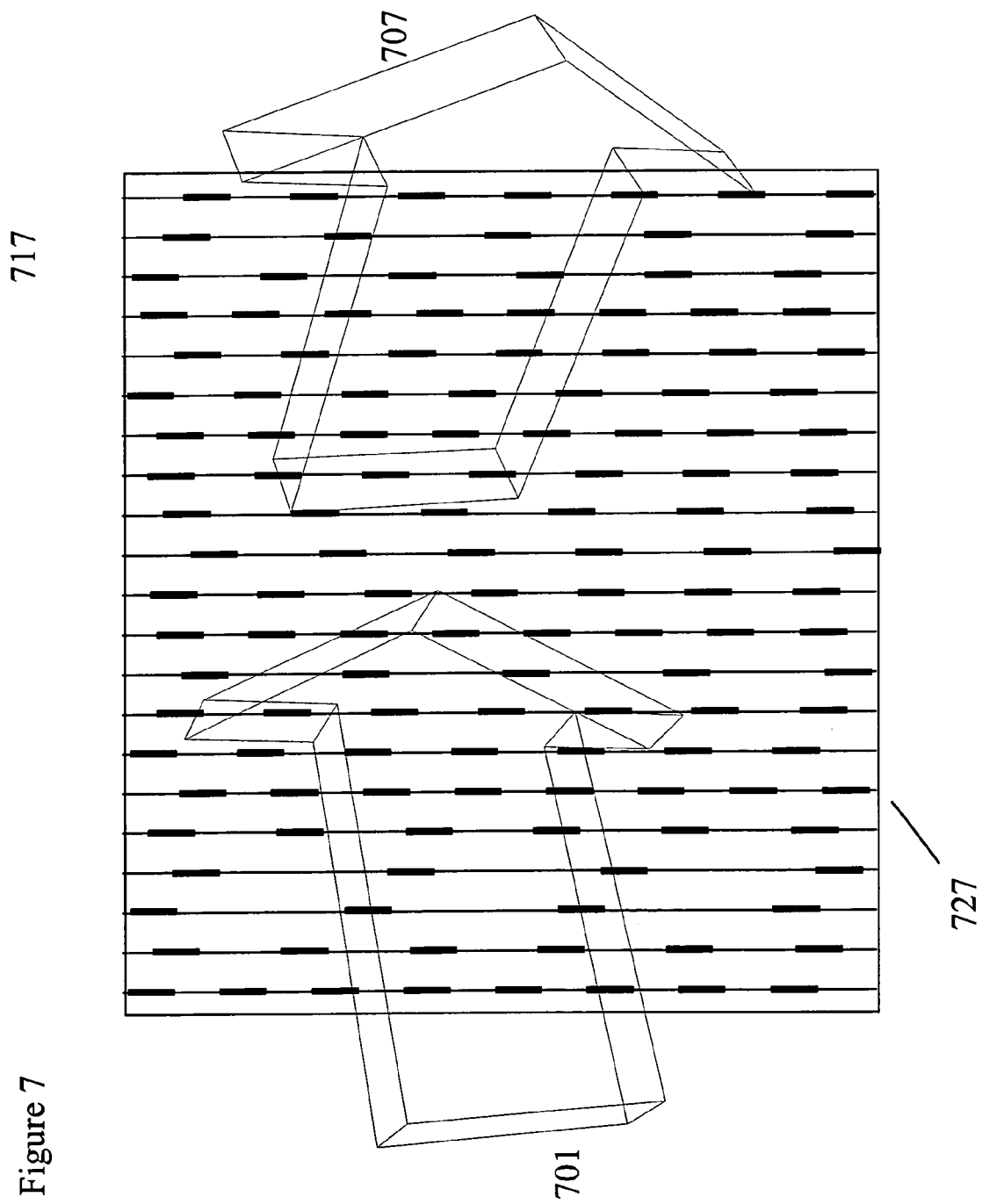
FIG. 7 is a schematic diagram of a distributed optical device implemented as an optical surface grating.

Another exemplary embodiment of the present invention is shown in FIG. 7, which depicts a diffraction grating comprising diffractive elements with various fill factors. The diffractive elements 727 lie within or on a surface and in the present example comprise essentially parallel virtual contours. An input field propagates toward the surface of diffractive elements through input port 701 (here defined functionally, primarily by an input propagation direction), while the resulting diffracted output field propagates away from the surface of diffractive elements through output port 707 (also defined functionally primarily by an output propagation direction). The surface containing the diffractive elements may be substantially planar or of a more complex geometry. The diffraction grating may comprise a surface grating or a volume grating, and may comprise a reflection grating and/or a transmission grating. The diffracting region(s) on the diffractive elements may be: grooves, such as ruled marks, etched trenches, etched ribs, and/or holographically defined grooves; index discontinuities, variations, and/or modulations; metallic and/or dielectric coatings spatially-selectively applied, altered, and/or removed; and/or other suitable structural features or alterations active to diffract, reflect, and/or scatter portions of the input field. In this embodiment, the diffractive elements have various fill factors and have fill patterns including various numbers of fixed length written segments per unit length along the diffractive element virtual contours. Other fill patterns may be equivalently employed. The control over relative diffractive amplitude of the various diffractive elements provides for the control over the spatial and spectral transfer function of the surface distributed optical structure. The relative amplitude of each diffractive element is proportional to the integral of the local diffractive element amplitude times the local input field amplitude integrated over the diffractive element virtual contour. Partial fill of the diffractive element provides for broad control of this amplitude. In order to make the relative diffractive element amplitudes relatively insensitive to the profile of the input field, the length employed for scribed segments should be chosen small compared to the minimum anticipated input field distribution. A diffracted output field may be generated on the same side of the surface distributed optical structure as the input field (reflection grating) and/or on the opposite side (transmission grating). In either case, partial fill grayscale diffractive elements enable the detailed tailoring of the spectral transfer function of the output field(s).

Width-Based Gray Scale

A second method for controlling diffractive element scattering amplitude, or the amplitude apodization function, according to the present invention includes controlling the width, w, (equivalently, the thickness) of individual diffractive elements. The width or thickness of diffractive elements is easily controlled using standard contact and projection lithography, using stamping or embossing based fabrication, or by other spatially-selective fabrication methods.

Figure 8:
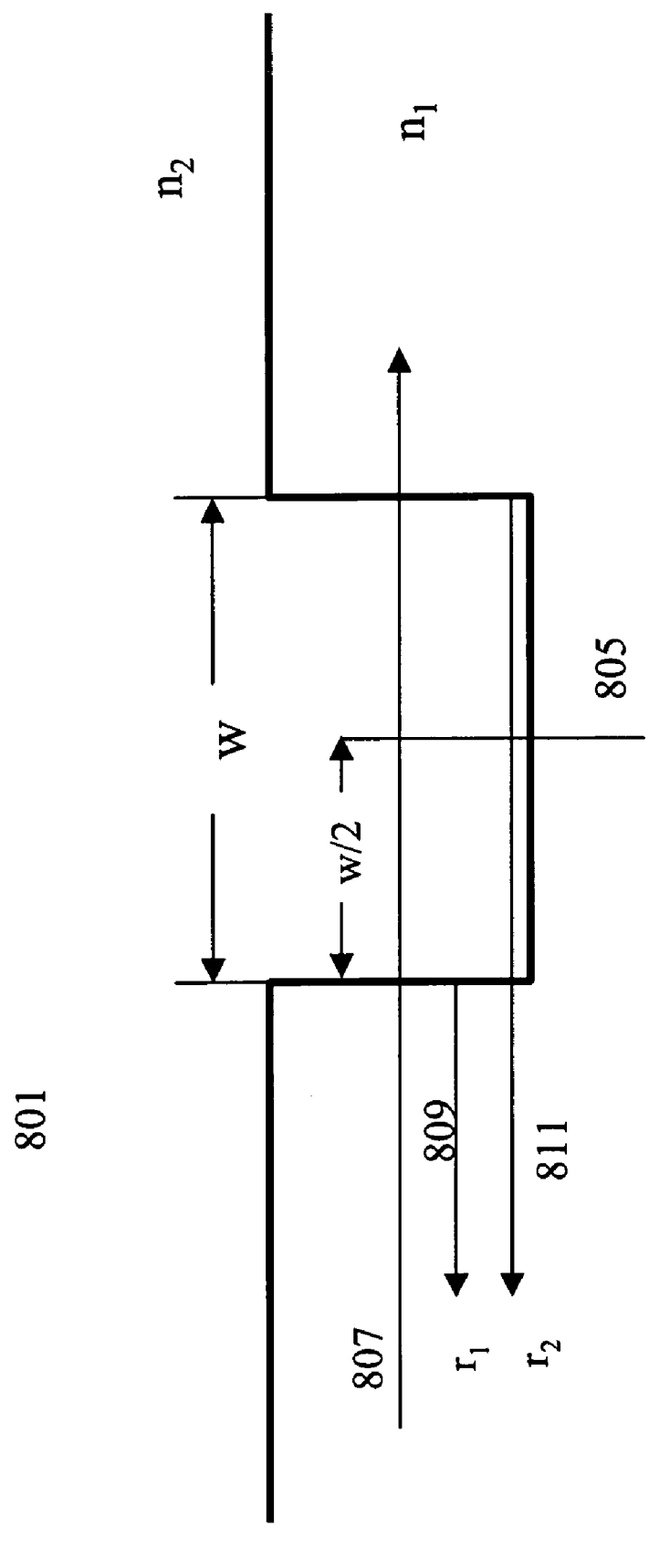
FIG. 8 is a cross-sectional view of an individual diffractive element.

The cross sectional profile of a single trench-type diffractive element 801 is shown in FIG. 8. Light incident through the waveguide 807 produces a reflected signal 809 from the front surface of the diffractive element and a reflected signal 811 from the back surface of the diffractive element. The two reflected signals add together coherently to create the net signal reflected (diffracted) back from the diffractive element. The phase difference of reflections 807 and 809 depends on the thickness of the diffractive element, w, and on the refractive index, $n_2$, of the diffractive element. In the limit that $n_1 = n_2$, the amplitude of the front and back surface reflections is essentially equal and the net reflected signal varies approximately as $\sin(2\pi n_2 w/\lambda)$, where $n_2$ is the refractive index within the diffractive element trench, w is the total width of the diffractive element, and $\lambda$ is the free space design wavelength. The net reflected signal amplitude exhibits a similar sinusoidal variation when $n_1$ and $n_2$ are significantly different from each other. However, depletion of the input signal by the front surface reflection prevents exact cancellation of the net reflection when the reflected components destructively interfere. When w is equal to approximately one quarter of the in-medium design wavelength the scattering amplitude is maximal. The scattering amplitude has the same maximal magnitude for each in-medium half wavelength ($\lambda/2n_2$) increase in the width. If the central position of the trench 805 is held fixed as the trench width is changed and $n_1 \approx n_2$, changes in diffractive element width lead to negligible phase changes in the diffracted signal. Phase changes are on the order of $2\pi(n_2-n_1)\Delta w/\lambda$, where $\Delta w$ is the width change. If $n_2-n_1 \approx 0.01$ and $\Delta w \approx \lambda/4n_2$, changes in reflected signal phase with changes in diffractive element width can be neglected for many purposes. It is clear that large changes in the scattering amplitude of a specific diffraction element can be achieved by controlling its trench width. While trench-like geometry has been described for specificity, considerations essentially identical follow for rib-type diffractive elements and indeed for any diffractive element comprising a front and back index discontinuity, variation, or modulation. In the case of irregular optical property spatial profiles, detailed simulation or empirical calibration are necessary to predictably exploit the variation in diffraction element spatial profile for amplitude control. To implement width-based (more generally: spatial-profile-based) diffractive element amplitude control, entire diffractive element virtual contours may be continuously written with diffractive element profile varying as necessary from diffractive element to diffractive element. It may also be desirable to vary diffractive element profile along an individual diffractive element virtual contour (variation within diffracting regions and/or among multiple diffracting regions), providing an additional degree of design control over the diffractive element transfer function. Profile-based and partial-fill gray scale may be used in combination with each other and/or in combination with additional diffractive element amplitude control factors such as feature depth or height. In general, variation of a spatial profile of an optical property within a diffracting region, from one diffracting region to another, and/or from one diffractive element to another enables nearly arbitrary determination of the transfer functions (element and collective transfer functions).

Proportional-Line-Density Gray Scale

A typical distributed optical structure may consist of many thousands of individual diffractive elements. An amplitude apodization function for the distributed optical structure may be viewed as a continuous function giving diffractive amplitude as a function of position along the direction of optical propagation through the structure. Amplitude apodization of a distributed optical structure may be implemented by giving diffractive elements at various spatial positions within the structure diffractive amplitudes proportional to a selected apodization function. Doing so would, in general, involve control over individual diffractive element scattering amplitudes. Proportional-line-density gray scale comprises an alternative to varying the diffractive amplitude of individual diffractive elements.

In a first embodiment of proportional-line-density gray scale, apodization functions are implemented in a distributed optical structure by treating the amplitude apodization function as a weighting function used to determine whether individual diffractive elements are written or omitted. In many cases, it will be desirable to give the peak apodization function value a writing probability weighting of unity so as to maximize the total number of diffractive elements written and therefore maximize the scattering strength (reflectivity) of the distributed optical structure as a whole. However, the peak of the amplitude apodization can be set to any desired writing probability weight between unity and zero. In a distributed optical structure thus apodized, the average number diffractive elements per unit length will vary with distance along an optical propagation direction in proportion to the amplitude apodization function. If the amplitude apodization function has a constant value and this value is set equal to unity writing probability, an apodized distributed optical structure will consist of equally spaced diffractive elements whose absolute spacing will be determined by the wavelength of the light to be reflected and the diffractive order in which the distributed optical structure operates. In first diffractive order, a spacing of one-half wavelength between diffractive elements would pertain if the distributed optical structure operates in retroreflection. The diffractive elements obtained in the case of unity probability writing weight may be referred to as nominal diffractive elements. If the writing probability is set equal to 0.5 instead, each nominal diffractive element location is populated with a written diffractive element with 50 percent probability. In more general cases where the amplitude apodization function varies spatially, the probability that any nominal diffractive element location is populated with a diffractive element is made proportional to the value of the amplitude apodization function at the location of the nominal diffractive element. This approach to apodization of distributed optical structures allows one to utilize diffractive elements of identical physical dimensions, which for some fabrication approaches may be most convenient, and still achieve local variation in the effective diffractive strength of the distributed optical structure.

The first implementation of proportional line-density gray scale is depicted schematically in FIGS. 9*a* and 9*b*. In FIG. 9*a*, a channel waveguide with a distributed optical structure written with constant apodization amplitude is depicted. The apodization function is a constant and the probability weighting function for writing diffractive elements, w(x), is set equal to unity. The short periodic vertical lines in FIG. 9*a* represent diffractive elements. With w(x)=1 throughout the distributed optical structure, the diffractive elements shown comprise all of the nominal diffractive elements of the structure. The diffractive elements may, for example, be lithographically scribed trenches in the top surface of the channel waveguide. In FIG. 9*b*, a channel waveguide is apodized according to a simple apodization function which is stepwise constant with the weighting at both ends of the channel waveguide being twice the apodization weight in the center of the channel waveguide. In this exemplary case, the diffractive element writing probability is equated to unity at the ends of the channel waveguide distributed optical structure while the diffractive element writing probability is set equal to 0.5 in the center. The nominal diffractive elements in the central region of the channel waveguide DBR were written or not written according to a random number generator providing numbers in the range of 0-1. The nominal diffractive element was written when the random number generator produced a number greater than 0.5. When larger numbers of diffractive elements are involved the number of diffractive elements per unit length is, on average, proportional to the amplitude apodization function when the described method of choosing which nominal diffractive elements are written is employed.

Figure 10:
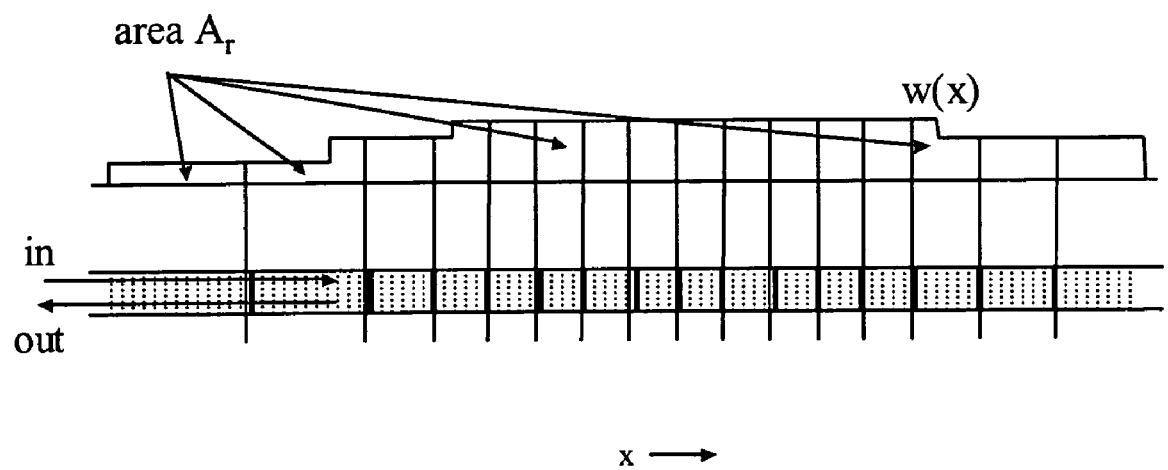
FIG. 10 is a schematic diagram of a distributed optical device having a position-dependent density of diffractive elements.

In some cases, it may be desirable to utilize a more deterministic approach to deciding whether diffractive elements are written or not written. In a second implementation of proportional-line-density gray scale, diffractive elements are written through reference to the accrued area under the amplitude apodization function. First, one chooses a reference unit of accrued area, $A_r$. Then one chooses a convenient reference location. Then one moves across the nominal diffractive element locations (i.e., virtual contour locations) and writes a diffractive element at the nominal diffractive element location closest to each location at which the accrued area under the apodization function increases by one $A_r$ unit. To maximize the total number of diffractive elements in the amplitude apodized distributed optical structure, which is often desirable to maximize peak overall reflectivity, one can choose the reference unit of accrued area $A_r$ to be equal to $A_m$, where $A_m$ is approximately equal to the nominal diffractive element spacing multiplied by the peak apodization value. When other reference units of accrued area $A_r > A_m$ are employed, the total number of written diffractive elements in the distributed optical structure will vary as $A_m/A_r$. If $A_r$ is chosen significantly smaller than $A_m$, the apodization function will be partially distorted. A channel waveguide distributed optical structure apodized using the method just described is shown schematically in FIG. 10.

Another variation of the present amplitude apodization method is implemented by dividing the distributed optical structure into sections each containing a fixed number of consecutive virtual contours. The number of virtual contours included in each section is set equal to the amplitude resolution desired in the apodization process. For example, if 10 levels of amplitude resolution are desired in the apodization, sections are set to a length that includes 10 virtual contours. The total number of sections in this example would be approximately equal to the total number of defined virtual contours divided by ten. To write the distributed optical structure, the apodization amplitude is normalized to peak value equal to the number of nominal diffractive elements assigned to each section. Then the average apodization amplitude throughout each section is rounded to an integer. Then a number of nominal diffraction elements are written within each section with that number being equal to the integer representing the rounded average apodization amplitude within the section. The nominal diffraction elements chosen for writing within each section can be chosen according to any convenient method.

In some cases, an apodization function can assume negative values implying a 180 degree phase change relative to positive apodization values. For the purposes of the present invention, the absolute value of the amplitude apodization function should be utilized for determining the probability that a given nominal diffraction element is chosen for writing. The phase shift implicit in negative versus positive values of the apodization function can be incorporated by introducing spatial shifts of the diffractive elements independent of relative amplitude control. Should a fully complex-valued apodization function be employed, the modulus of the apodization function should be employed in the exercise of proportional-line-density gray scale with phase control implemented through other means including spatial shifts of the diffractive elements or changes in their reflective phase as for example by changing their widths.

In general overview, it should be noted that amplitude apodization can be achieved in a variety of distributed optical structures by controlling the number of diffractive elements per unit length to vary in proportion to the desired amplitude apodization function to achieve numerous levels of gray scale. Such structures may include, but are not limited to: 2D planar distributed optical structures, 1D channel waveguide distributed optical structures, fiber Bragg grating distributed optical structures, 3D distributed optical structures, and other such distributed optical structures. There are many variations as to how to choose which of the nominal diffractive elements should be written, but it is the essence of the present invention that the local density of diffractive elements per unit length be controlled to vary proportionally the desired amplitude apodization function.

Facet-Displacement Gray Scale

A potential drawback of gray scale approaches described thus far is that they involve spatial variation in the density of optical alterations employed to form diffracting regions. Such optical alterations (e.g., trench etching) may locally alter the effective refractive index. Specifically, parts of the distributed optical structure in which diffracting regions are spatially sparse may have a different effective refractive index and consequently a different resonance wavelength compared to parts of the distributed optical structure in which diffracting regions are spatially dense. It is possible to design distributed optical structures employing the gray scale methods described above to compensate for the effective refractive index variations introduced by spatial variations in the density of optical alterations. This can be done by varying the diffractive element spacings so that the product of local effective refractive index (dependent on local fill factor, local element width, and/or local written-element density) multiplied by diffractive element spacing (the optical path between diffractive elements) is maintained at a value appropriate for proper functioning of the distributed optical structure. The variation of local effective refractive index introduced by variations in the spatial variation of optical alterations can be calculated using standard methods known in the art or can be calibrated by actual measurement of test devices having different densities of optical alteration. An alternative method of compensation comprises a variation in waveguide geometry, for example the thickness of a slab or channel waveguide, to hold the total effective refractive index of the distributed optical structure at a desired value or range of values. Nevertheless, approaches to reflective amplitude and/or phase control in distributed optical structures that leave areal element density and effective waveguide refractive index largely unchanged (and therefore requiring no compensation) are desirable. Under the general descriptor "facet-displacement gray scale" are several approaches that allow one to control the reflective amplitude of diffractive contours while maintaining a substantially constant spatial density of optical alterations and thus substantially constant effective refractive index. Such approaches may also enable amplitude and phase control while requiring only a single lithographic depth to form all of the diffractive elements and diffracting regions thereof.

Figure 11B:
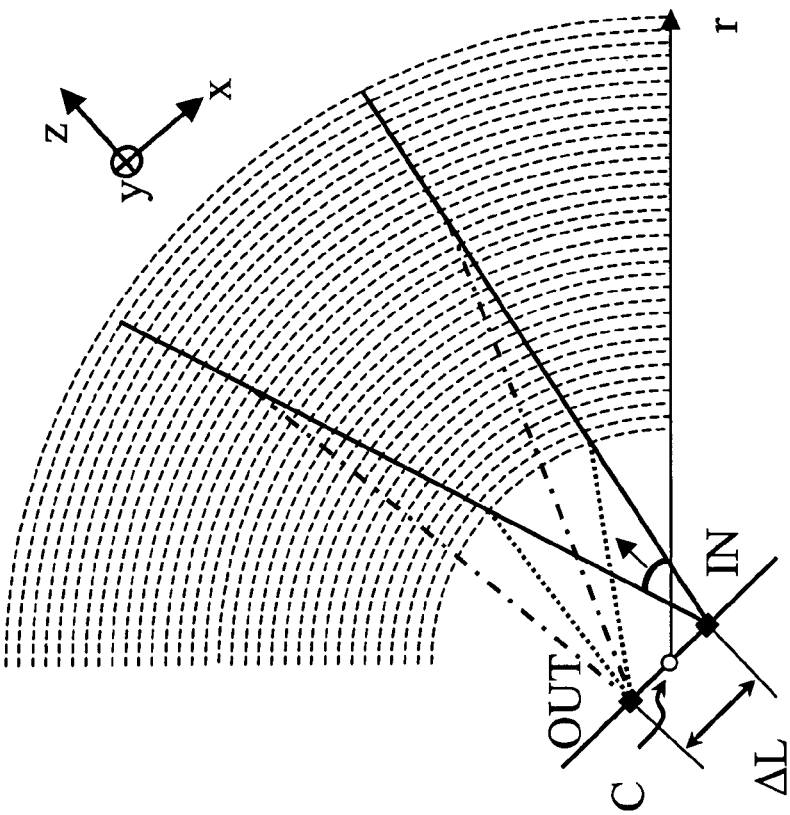
FIGS. 11a and 11b are side cross-section and top views of a distributed optical device.
Figure 11A:
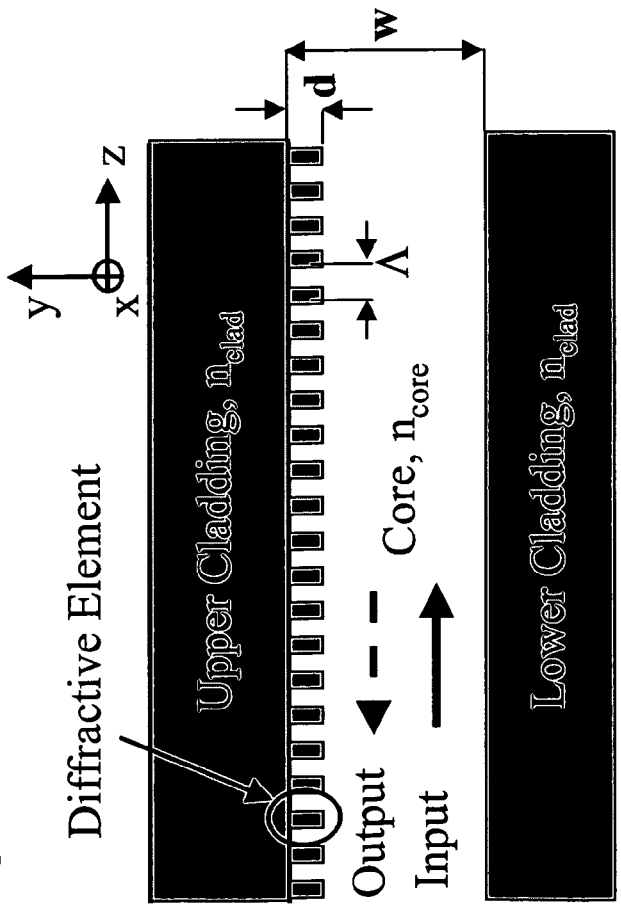

FIGS. 11A and 11B are pictorial representations of a holographic Bragg reflector (HBR). A typical HBR cross-section is shown in FIG. 11A, while FIG. 11B is a schematic top plan view. The HBR consists of a slab waveguide with a central core of thickness w and bilateral cladding layers. For single-mode waveguides, the core thickness w is typically 2 to 6 times the in-medium design wavelength of the device. For multimode applications, w can be on the order of 30 to 60 times the in-medium design wavelength of the device. For example, at communication wavelengths ($\lambda_{air} \sim 1.5$ μm), the thickness of the planar waveguide may be about 4 μm, if the waveguide medium is silica, core-cladding refractive index differences on the order of 0.01 are employed, and single-mode operation is desired. While a HBR is set forth as an exemplary embodiment for illustrating the principles of facet-displacement gray scale, it should be noted that the principles thus illustrated may equivalently apply to any distributed optical structure, including those disclosed herein and equivalents thereof, within the scope of the present disclosure and/or appended claims.

FIG. 11A depicts cross-sections of representative diffractive regions of depth d and spacing Λ, which, for the specific exemplary embodiment of FIGS. 11A and 11B, are located at the upper core-cladding interface and consist of trenches that are filled with cladding material. For operation in the $m^{th}$ diffractive order, the spacing $\Lambda = m \cdot \lambda_0 / 2n_{\it{eff}}$, where $n_{\it{eff}}$ is the effective refractive index of the waveguide and $\lambda_0$ is the vacuum wavelength of the reflected light. For example, at a wavelength of $\lambda_0 = 1.5$ um, in first order (m=1), and with a silica core material ($n_{\it{eff}} \approx 1.5$), $\Lambda \approx 500$ nm. Other locations for the diffracting regions, e.g. entirely within the waveguide, are possible and such geometries should be considered within the scope of the presently discussed invention. Other types of diffractive elements are possible as well, e.g. ribs on top of the waveguide core or bulk refractive index changes in the core material induced by optical exposure or other means. The facet-displacement gray scale control methods (as well as other reflective amplitude and phase control methods) disclosed in the present application are applicable to a broad range of diffractive element morphologies and, while discussion thereof may be limited to specific examples, application of the disclosed methods to diffractive element forms different from those specifically discussed should be considered within the scope of the present disclosure and/or appended claims.

FIG. 11B is a top view of the two-dimensional waveguide containing the planar HBR. An optical signal is coupled into the planar grating device via an input port, IN, that is comprised of but not limited to a channel waveguide, an edge mounted fiber, or the focal spot of a free-space light source. The input beam expands by diffraction in a slab region and is subsequently spectrally filtered and spatially directed to the output port, OUT, by the planar hologram. The diffractive elements of the HBR are spatially defined with respect to virtual contours that are represented by the dashed lines in FIG. 11B. The virtual contours may be designed individually to optimally spatially mode-match the back-diffracted input field to the output port, and are positioned relative to one another so that a superposition of diffracted field components at the design wavelength would exhibit maximal constructive interference (if the diffracting regions of the corresponding diffractive elements were to spatially coincide with the virtual contours). As disclosed hereinabove and in the above-cited references, the detailed spacing and relative amplitude of the diffractive elements corresponding to the virtual contours as a function of position along the input direction determine the spectral transfer function of the device. Specifically, in the limit of weak device reflectivity, the HBR spectral transfer function is proportional to the spatial Fourier transform of the complex-valued diffractive element amplitude and phase distribution. In the device discussed here, the virtual contours are circular arcs which are concentric about center of curvature, point C. Such virtual contours do not provide optimal input-output spatial mapping. Optimal virtual contours may be generated following procedures known from the design of aspheric reflective optics. The approaches to reflective amplitude control that will be disclosed herein apply to diffractive virtual contours of arbitrary shape. Even though facet-displacement gray scale is discussed in the specific context of exemplary virtual contours of relatively simple shape, this must not be construed as limiting the scope of the of the present disclosure and/or appended claims.

Figure 12:
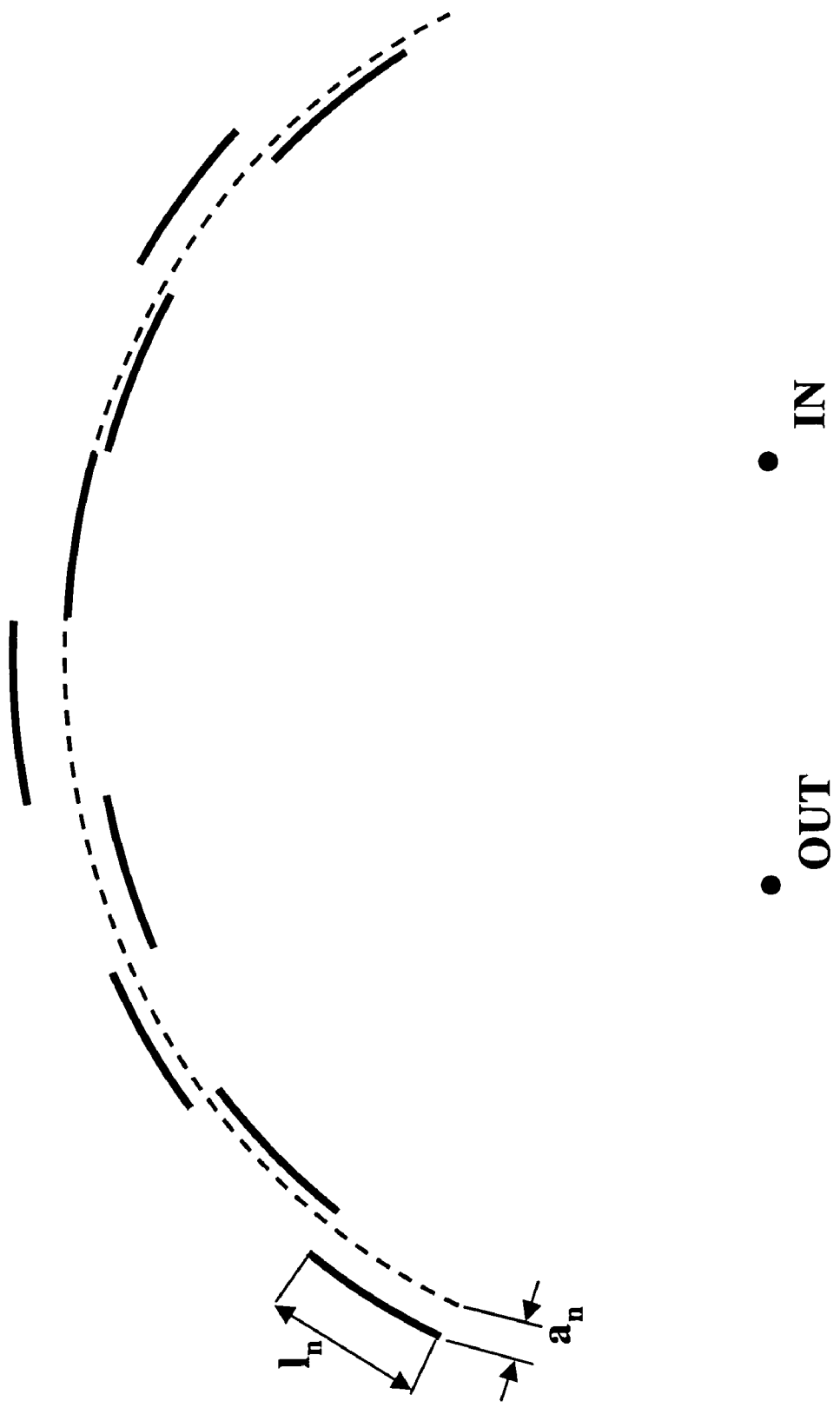
FIG. 12 illustrates schematically a diffractive element having varying longitudinal facet displacements relative to a virtual contour.
Figure 13:
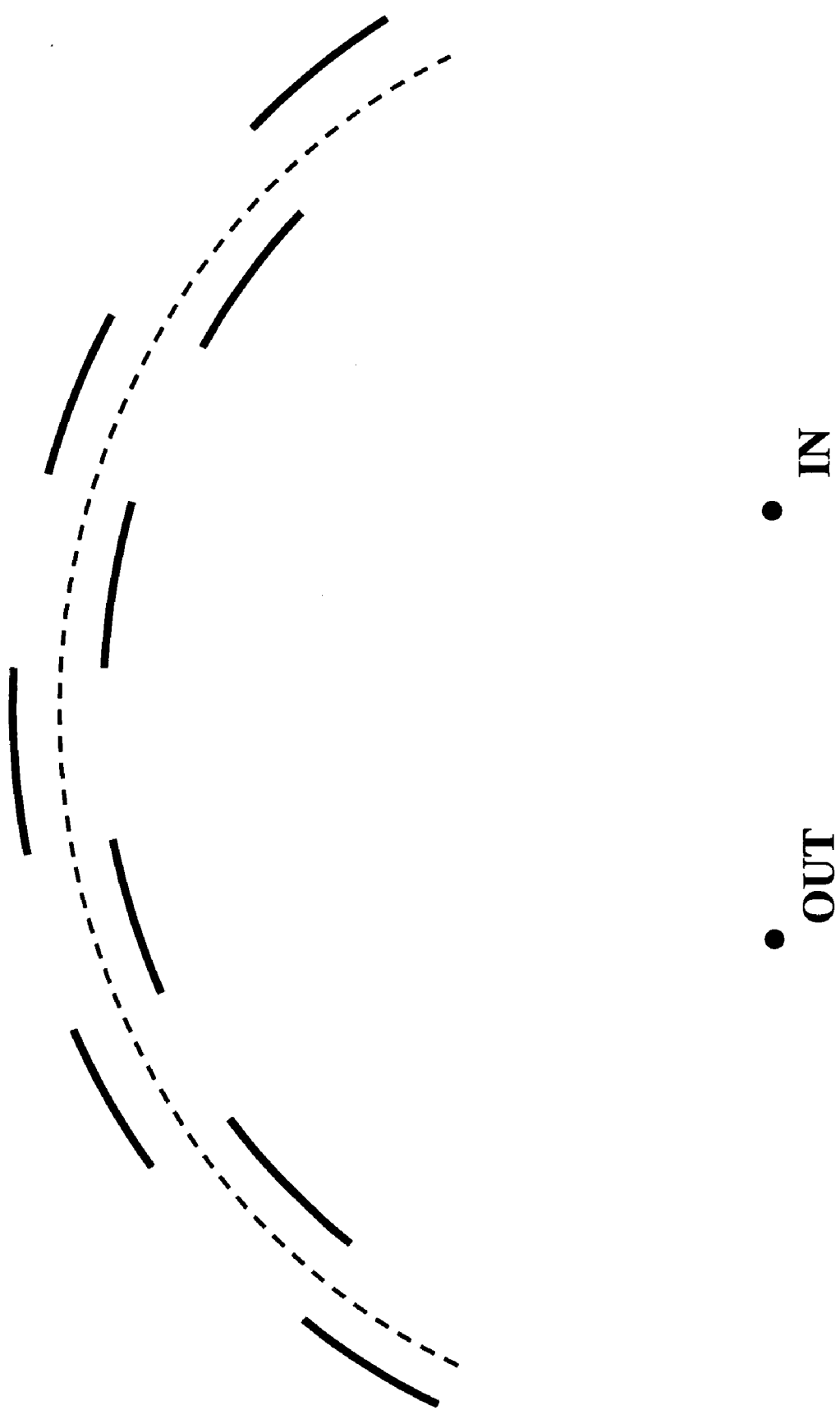
FIG. 13 illustrates schematically a diffractive element having uniform longitudinal facet displacements relative to a virtual contour.
Figure 14:
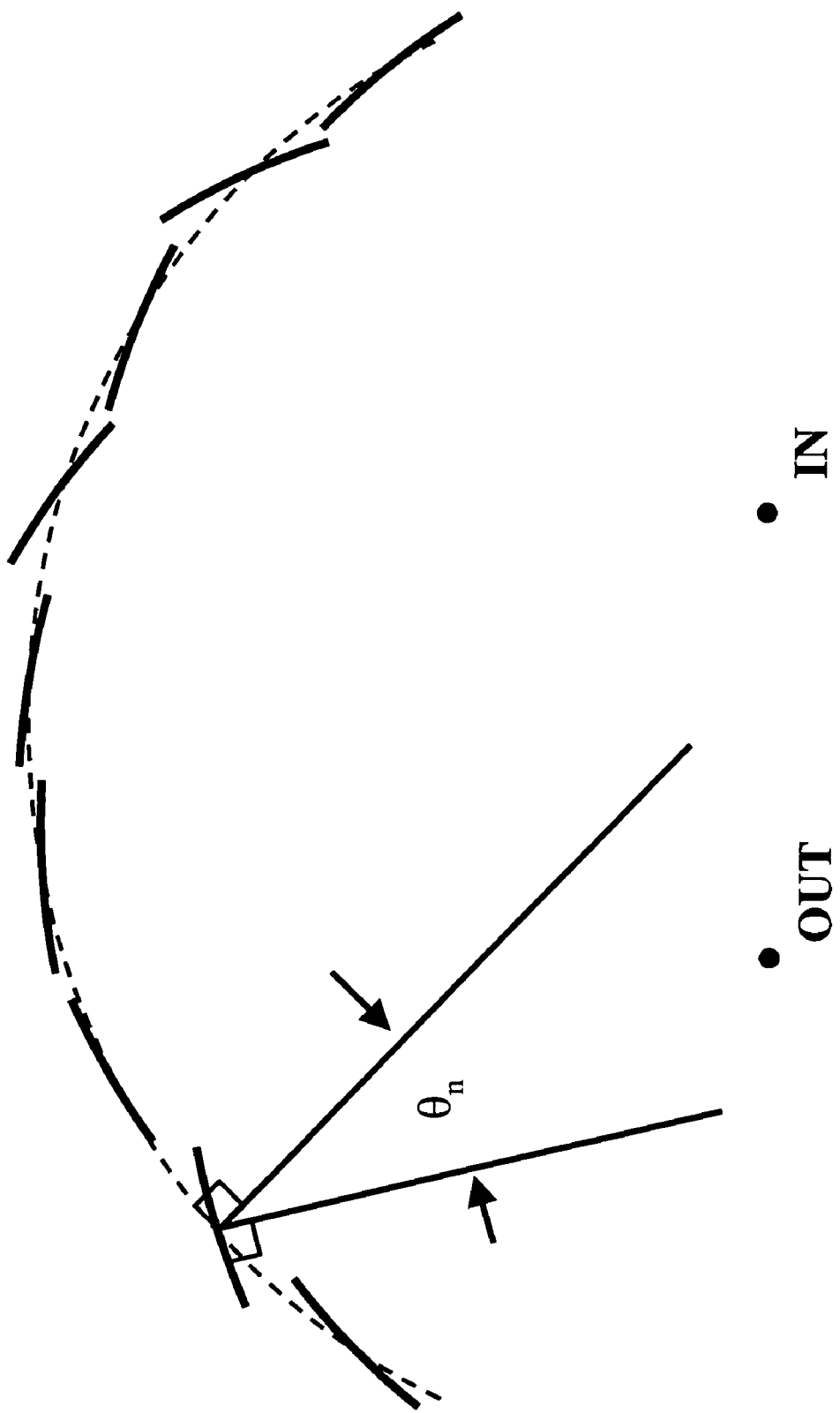
FIG. 14 illustrates schematically a diffractive element having angular facet displacements relative to a virtual contour.

FIGS. 12-16 shows an exemplary individual diffractive element of a distributed Bragg structure. The diffractive element is designed to couple light from an input port, IN, to an output port, OUT. The dashed line in FIGS. 12-16 represents an equal phase virtual contour, i.e. all optical paths connecting the centers of the input and output ports via reflection from this contour exhibit the same optical distance. While equal-phase virtual contours are frequently employed in the design of distributed optical devices (and is employed in the present example), virtual contours that are not equal-phase contours may also be employed within the scope of the present disclosure and/or appended claims. The diffractive element corresponding to the virtual contour comprises multiple diffractive facets (i.e., diffracting regions, represented by solid lines) shown in the exemplary embodiments of FIGS. 12-16 as curvilinear segments along the virtual contour. In the specific embodiments of FIG. 12-14 the diffracting facets are presumed to consist of simple reflective surfaces. As discussed below, the diffracting facets may be realized in the form of etched trenches, ribs, bulk refractive index changes, etc. A given diffracting facet n is characterized by its angular orientation $\theta_n$ (FIG. 14), offset $a_n$ from the virtual contour (FIGS. 13 and 14), and by its angular span $I_n$ (FIGS. 12-14). The angle $\theta_n$ is defined to be the angle between the facet's central surface normal and the normal to the virtual contour measured at the point nearest to the facet center. The offset an may be conveniently measured from the diffracting facet center of gravity. The overall imaging properties of the diffractive element, comprising all diffracting facets along a given virtual contour, are heavily influenced by the orientation, offset, and span of all its constitutive diffracting facets. The specific embodiments of FIGS. 12-14 show diffractive elements comprising diffracting facets which all have essentially the angular span $I_i$. Realizations of diffractive elements employing diffracting facets that are different from each other in this or other parameters are possible and should be regarded as within the scope of present disclosure.

The electric field at the device output port OUT produced by a specific diffractive element is given by the coherent sum of the fields diffracted from the individual diffracting facets. For a given diffracting facet, the back-diffracted field amplitude is determined by the input field amplitude at the location of the diffracting facet and the facet's reflection coefficient, $r_n$. The exemplary analysis given here will omit variations of reflection coefficient or input field along the diffracting facet's length. Nevertheless, cases in which either or both of the aforementioned phenomena occur should be regarded within the scope of the disclosed invention. Means for including such variations involve integrating varying quantities across facets and are well known in the art. The electric field value at the output port OUT is typically maximal when the contributions from all diffracting facets to the coherent sum at the output port are phased to constructively interfere. In the embodiments of FIGS. 12-14, fully constructive interference among the facets occurs at the output port center when all diffractive facets are spatially coincident with an equal-phase virtual contour, i.e. when $a_i = \theta_i = 0$, where i denotes the ith diffracting facet.

Since the total field reflected from the diffractive element shown in FIG. 12 is given by the coherent sum of the contributions originating from its constituent diffracting facets, control of the strength of the overall reflected field, for a given wavelength, may in principle be attained via three different approaches. First, methods may be devised that affect the amplitude of the individual back-diffracted fields while leaving the phase relationships between them (as determined at the output port) unchanged from those implemented in the equal-phase virtual contour shown in FIG. 12. Such approaches have been addressed hereinabove and in several of the above-cited applications. Second, approaches may be devised in which the overall magnitude of the output field is affected by altering the phase relationships between the fields emerging from individual facets while leaving the field strength of the latter (approximately) unchanged. A third category consists of methods in which reflective amplitude control is achieved through both affecting the field amplitude and optical phase of the individual facet fields. Facet-displacement gray scale is primarily concerned with methods to control the reflective amplitude of a diffractive element that fall into the second and third categories.

FIGS. 12 and 13 address approaches to reflective amplitude control that are based on longitudinally offsetting diffractive facets (i.e., diffracting regions) from an equal-phase virtual contour, i.e. choosing values $a_i$ different from zero that vary from facet to facet. The spatial offsets of the diffracting facets from the equal-phase virtual contour introduce optical phase differentials between different facets that affect the amplitude of the total output field as measured at the output port. The approach presented in FIG. 12 provides, in principle, for continuous control of the reflective amplitude of the diffractive element in the range from zero reflective amplitude, when the individual diffracting facets are phased to cancel each other's contribution at the output port (i.e., destructively interfere), to a maximum value occurring when all facet field contributions are in phase (i.e., constructively interfere).

The specific values $a_i$ employed for offsetting diffracting facets may be determined randomly or according to deterministic functions. An example of a diffracting facet arrangement falling into the latter category is shown in FIG. 13. Here, adjacent diffracting facets are alternately displaced by ±b from the equal-phase virtual contour, i.e. a spatial offset of the same magnitude but alternating from side to side of the virtual contour. When b is equal to $\lambda_0/(8n_{eff})$ the overall reflective amplitude of the entire diffractive element is approximately zero. Periodically structured positional arrangements of diffracting facets, such as the one shown in FIG. 13, may exhibit diffraction maxima in the output plane at locations different from the designed output port. These are caused by fully or partially constructive interference of light diffracted from the offset facets and may be detrimental to device performance. Choosing spatial offset values that are random in offset magnitude and direction, as shown in FIG. 12, provides a pathway for mitigation of this problem, if necessary or desired. A drawback of randomly distributed offset values, however, is that the resulting overall reflective amplitude can only be designed within the precision dictated by the laws of statistical analysis. A combination of random facet displacement and deterministic control is also possible. An initial set of facet displacements with an rms value set to statistically provide the desired net diffractive element reflective amplitude may be calculated. Then the sum of the fields generated may be calculated and adjusted to a precisely desired value by resetting the longitudinal displacement of one or more facets. It should be noted that once the distribution of displacements $a_i$ have been determined to set the reflective strength of a diffractive element to a desired value, a uniform additional displacement may be added to all diffracting facets of the diffractive element to set the overall phase of the field reflected from the diffractive element relative to that of other diffractive elements of a distributed optical structure.

In the specific embodiment of FIG. 12, the spatial offset values fall in the range between $a_i = \pm \lambda_0/(8n_{eff})$, where $\lambda_0$ is the vacuum wavelength of light at the center of the overall reflective bandpass of the distributed optical structure (i.e., the design wavelength). Spatial displacements in this range correlate with changes of the back diffracted field phases in the range of $\pm\pi/2$ as measured at the output port. Phase changes implemented over the range $\pm\pi/2$ can provide full reflective amplitude control. Larger phase differences correlated with proportionately larger spatial displacements between constituent facets of the diffractive elements may be implemented to achieve reflective amplitude control as well. However, one must consider that, in general, the reflectivity of the diffractive element will exhibit a stronger wavelength-dependence as the maximum optical path difference between diffractive facets is increased. The fractional spectral bandpass, $\Delta\lambda/\lambda_0$, over which the reflectivity remains relatively constant is given approximately by $\lambda_0/L$ where L is the maximal displacement employed.

FIGS. 19A-19E depict schematically a single-mode channel waveguide 1901 having diffractive elements. In FIG. 19A, the diffractive elements 1905 have substantially identical longitudinal cross-sections, are substantially identical in transverse extent, and are substantially uniformly spaced. As already described hereinabove, the phase of an individual diffractive element may be adjusted by displacing the element from its corresponding virtual contour in either direction along the propagation direction of the channel waveguide. In FIG. 19B, each diffractive element is divided into facets (two facets in this example) that may be displaced by various distances about the corresponding virtual contour in order to control the reflective amplitude or phase of the individual diffractive element. Diffractive elements 1913, 1917, and 1921 are modified in this way to yield desired levels of diffractive element amplitude. Calibration of these differential displacements enables element-by-element control of the diffractive element amplitude or phase. Symmetric displacements of the facets of a diffractive element enable alteration of its diffractive amplitude while leaving its relative phase unaltered. Asymmetric displacement of the facets of a diffractive element may be employed to alter both diffractive amplitude and phase.

FIGS. 19C-19E illustrate schematically several exemplary approaches for displacing the facets of an individual diffractive element or altering their reflective amplitude. In FIG. 19C, facets 1933 of a diffractive element span the waveguide core and are displaced substantially symmetrically about the corresponding virtual contour 1929. In FIG. 19D, facets 1935 of a diffractive element do not span the waveguide core and are displaced substantially symmetrically about the corresponding virtual contour. In FIG. 19E, facets 1939 of a diffractive element are of differing transverse extent and are displaced asymmetrically about the corresponding virtual contour.

The phasor diagrams of FIGS. 20A-20F illustrate schematically the field amplitude and phase resulting from these types of facet displacements. In FIG. 20A, two phasors 2003 are used represent the amplitude and phase diffracted by facets of an element such as 1909 of FIG. 19B. Since the facets are not displaced from the virtual contour, the resulting phasors are parallel and yield the resultant phasor 2007 of FIG. 20B lying along the in-phase axis of the diagram (i.e. the horizontal axis, equivalent to no phase shift relative to the position of the virtual contour). For facets such as 1933 (displaced symmetrically relative to the corresponding virtual contour 1929), the corresponding phasors 2011 are angularly displaced symmetrically about the in-phase axis of the phasor diagram in FIG. 20C. The phasors 2011 are of equal length, since the facets 1933 are of the same transverse extent and therefore produce the same diffracted amplitude. The resultant phasor 2015 (FIG. 20D) has its phase unchanged (i.e. it still lies along the axis) but has a reduced amplitude (relative to FIG. 20B), illustrating the ability to control the diffracted field amplitude by facet displacement. The phase of the diffracted field could also be altered by asymmetric displacement of the facets, yielding corresponding asymmetric angular displacement of the phasors and a resultant phasor not lying on the axis. The facets 1935 (FIG. 19D) would result in a qualitatively similar phasor diagram, albeit with amplitudes differing from those of FIG. 20D since the facet diffracted amplitudes would presumably differ. For facets 1939 (FIG. 19E), the corresponding phasors 2019 (FIG. 20E) are of differing lengths (i.e. differing diffracted amplitudes) and differing angular displacement relative to the in-phase axis of the diagram (i.e. differing diffracted phases). The differing amplitudes arise from the differing transverse extents of the diffractive element facets 1939, while the differing phases result from differing displacements relative to the corresponding virtual contour. In this example, the resultant phasor 2023 is shown in FIG. 20F lying along the in-phase axis, and with an amplitude less than that shown in FIG. 20B. In other words, the relative amplitudes and phases of the facets 1939 were chosen to yield zero overall phase shift and reduced overall amplitude. Other combinations of facet amplitude and phase may be employed to yield desired combinations of overall diffracted amplitude and phase for each diffractive element.

The arrangements of diffractive elements in channel waveguides as depicted in FIGS. 19A-19E and described according to FIGS. 20A-20F also may be implemented for controlling diffracted amplitude and phase for diffractive elements in planar waveguides or in optical elements allowing optical signal propagation in three dimensions. Examples of such implementations are disclosed elsewhere herein.

FIG. 14 depicts a different approach to reflective amplitude control. Here, constituent diffracting facets exhibit angular offsets of varying degrees with respect to the equal-phase virtual contour. Maximum coupling to the output port is achieved when all diffracting facets are oriented along the virtual contour profile, which is assumed to be configured to image the input port onto the output port. Angular orientations deviating from this configuration will result in weakened optical coupling. One approach to determining the detailed angular placement of the facets to produce various levels of reflective amplitude is to first assign relative angular displacements in the interval [−1,1]. This may be done randomly or deterministically, with the provision, for pure amplitude control, that individual facet angular displacements are adjusted via standard diffractive calculations to substantially eliminate phase changes in the net diffracted field at the output port. Numerical application of diffraction theory is utilized to find the relative reflective strength of the facet distribution when the fixed set of relative angular displacements is multiplied by various fixed angles in the range $[0, \pi/2]$. This process results in a calibration of diffractive element reflective amplitude versus an angular displacement multiplier, which can be used to amplitude apodize the multiple diffractive elements of a distributed optical structure. Other algorithms for determining relative angular displacements of diffracting facets for diffractive element amplitude control may be equivalently employed, and shall fall within the scope of the present disclosure and/or appended claims. Such angular displacement of facets of diffractive elements may be implemented in planar waveguides (as in the example of FIG. 14), in channel waveguides (as in FIGS. 21A-21C, described hereinbelow), or in an optical element allowing propagation of optical signals in three dimensions.

FIGS. 21A-21B depict schematically angularly displaced diffractive elements in channel waveguides. These examples may be regarded as falling within the description of facet-displacement grayscale, with each diffractive element consisting of only a single facet. In FIG. 21A, diffractive elements 2103 are shown oriented substantially perpendicular to the propagation axis of channel waveguide 2101. The diffracted amplitude of such diffractive elements may be used as a reference for comparison. Diffractive elements 2007 are oriented in a non-perpendicular orientation (i.e. with an angular offset), thereby reducing their diffracted amplitude relative to diffractive elements 2103. A correlation between diffracted amplitude and angular offset may be established by calculation or by empirical measurement, and diffractive structures designed with the desired diffracted amplitude of each diffractive element achieved by forming it with the appropriate angular offset. In FIG. 21B, a channel waveguide is schematically depicted wherein the angular offset of diffractive elements 2111 varies along the length of the waveguide to achieve a desired spectral passband for the diffractive element set.

Figure 15:
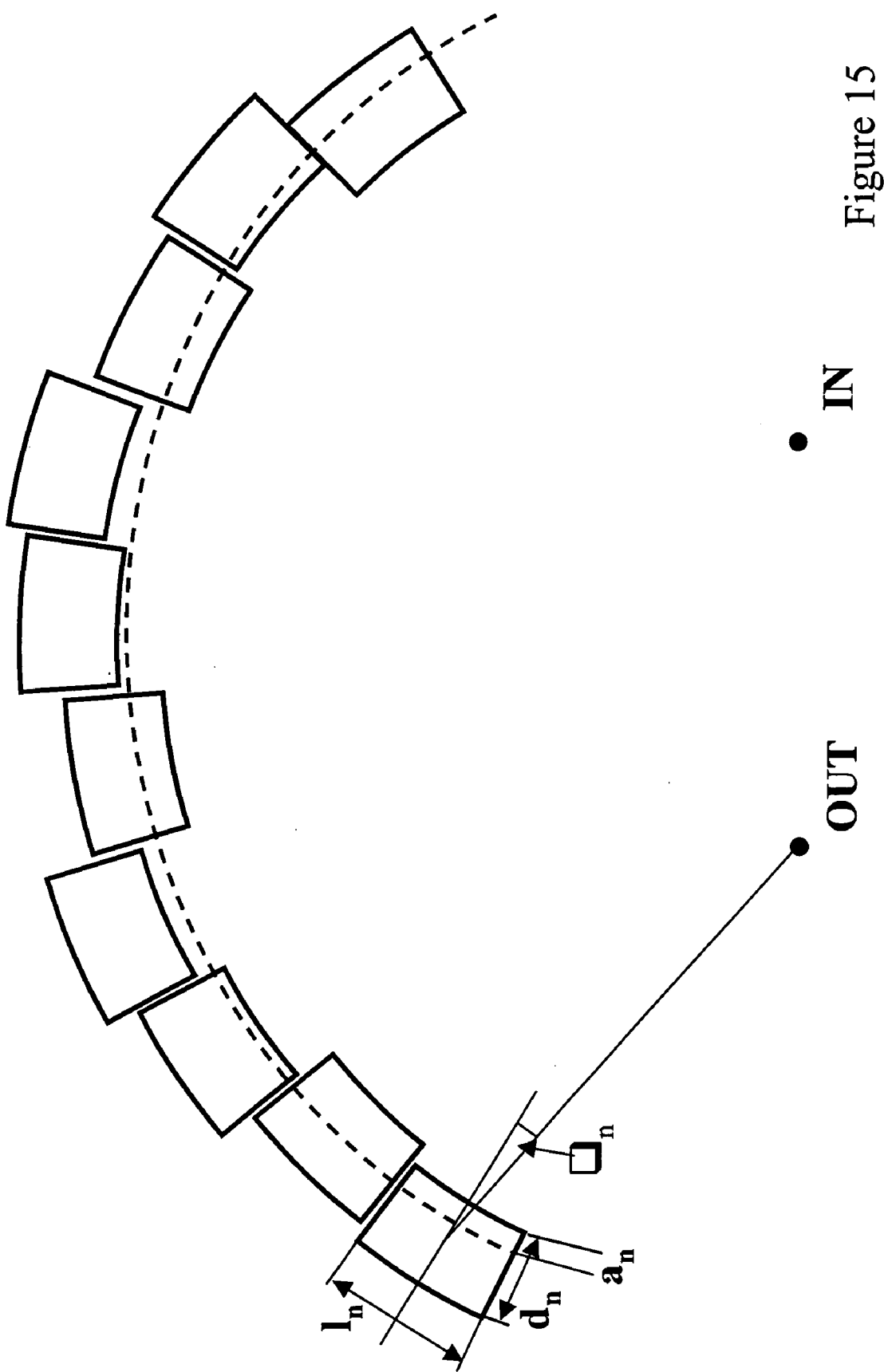
FIG. 15 illustrates schematically a diffractive element having uniform facet thickness and varying longitudinal facet displacements relative to a virtual contour.
Figure 16:
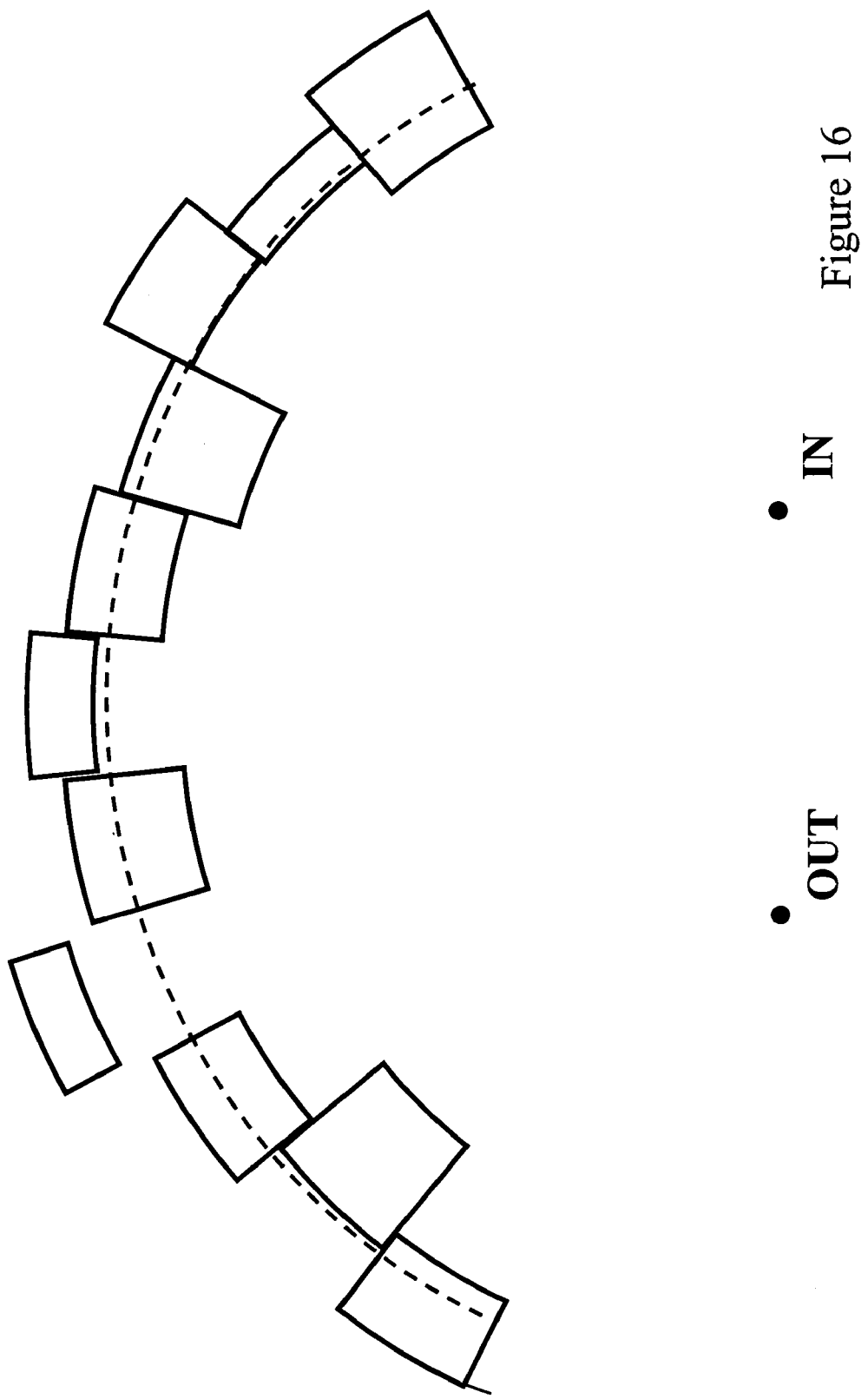
FIG. 16 illustrates schematically a diffractive element having varying facet thickness and varying longitudinal facet displacements relative to a virtual contour.

FIGS. 15 and 16 show a different type of diffractive element, which may be viewed as employing a combination of facet-displacement and width-based gray scale. The diffractive element comprises multiple diffracting facets, each with two reflecting surfaces. Such facets are generated, e.g., by etching a trench into a material of a given dielectric constant and filling it with material of a different dielectric constant. Again, a given diffracting facet n may be characterized by its angular orientation $\theta_n$, offset $a_n$ from a virtual contour, and by its angular span $I_n$. An additional parameter, distinct from the conceptual single-surface diffractive facets of FIGS. 12-14, is the optical thickness or optical pathlength, $d_n$, of the two-surface facets, given by physical distance between the two surfaces times the facet refractive index. All the aforementioned approaches to the control of a diffractive element's reflective amplitude apply to the case of two-surface diffracting facets. Additionally, for a given wavelength, the parameter $d_n$ may be used to control the amplitude of the light back-diffracted from the facet as disclosed for the case of entire contours hereinabove (i.e., width-based gray scale). FIG. 15 shows an embodiment where a diffractive element comprises facets of the same thickness, while FIG. 6 shows an embodiment where a diffractive element comprises facets having varying thicknesses. Control over the distribution of facet thicknesses and displacements provides control over the net reflectivity of the entire diffractive element. Again, the facet-to-facet width variations may be implemented in a statistical or deterministic way, with the aforementioned advantages and disadvantages.

Figure 17:
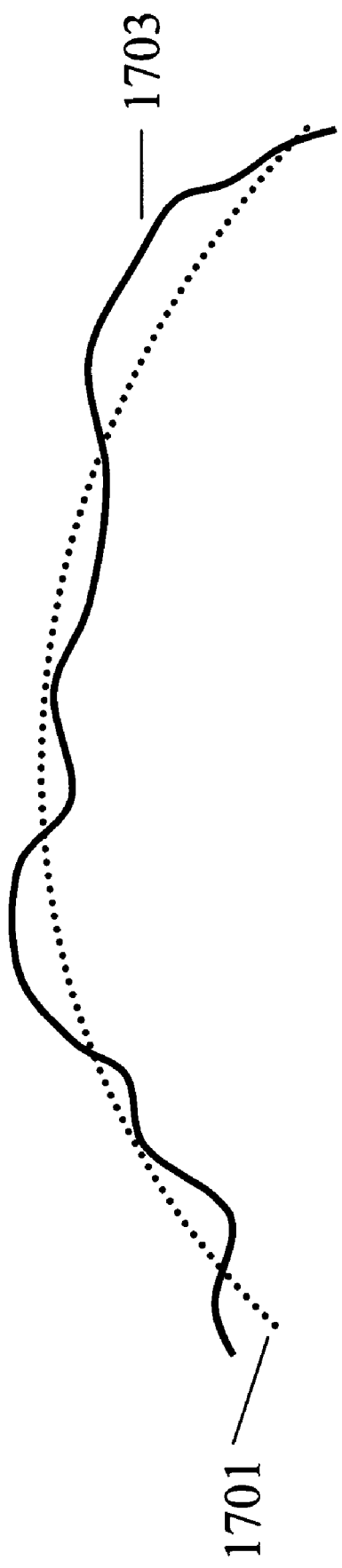
FIG. 17 illustrates schematically a diffractive element having angular and longitudinal facet displacements continuously varying relative to a virtual contour.

In the above disclosures, diffractive contours have been described as having been divided into facets. This is not necessary. The reflective amplitude of diffractive elements can equally well be controlled by introducing displacements of various portions (i.e. diffracting regions) of a single continuous diffractive element about a corresponding virtual contour. This scenario may be still described in terms of the facet descriptions above, but the facet displacements and angular orientations are constrained so that facets connect at their ends. Such a configuration is shown in FIG. 17, where the dashed curve 1701 represents an equal-phase virtual contour and the solid line 1703 represents a diffractive element comprising a single continuous diffracting region, with various portions thereof displaced from the virtual contour. Division of the diffractive element into sufficiently many connected diffracting facets enables description of the diffractive element in terms of longitudinal and rotational facet displacements (as described hereinabove). Similarly, the optical thickness of the diffractive element may be varied along the virtual contour, and maybe described in terms of multiple connected facets of varying optical thickness. These "continuous-facet" approaches shall fall within the scope of the present disclosure and/or appended claims.

An implementation in a channel waveguide of a "continuous-facet" grayscale approach is illustrated schematically in FIG. 22. A diffractive element 2219 is distorted into a curve, resulting in modal spatial mismatch between the incident field and the diffracted field and reduced diffracted amplitude. The distortion of the diffractive element 2219 is brought about by position and angle offsets of differing portions of the continuous diffractive element. The extent of spatial distortion (i.e. the extent of the deviation of the diffractive element geometry from a flat, perpendicular diffractive element geometry) may be correlated with the corresponding diffracted field amplitude, by calculation or empirical measurement. The spatial distortion of diffractive elements may then be varied along the length of the channel waveguide to achieve a desired overall spectral passband for the diffractive element set.

Element-Displacement Gray Scale

Figure 18:
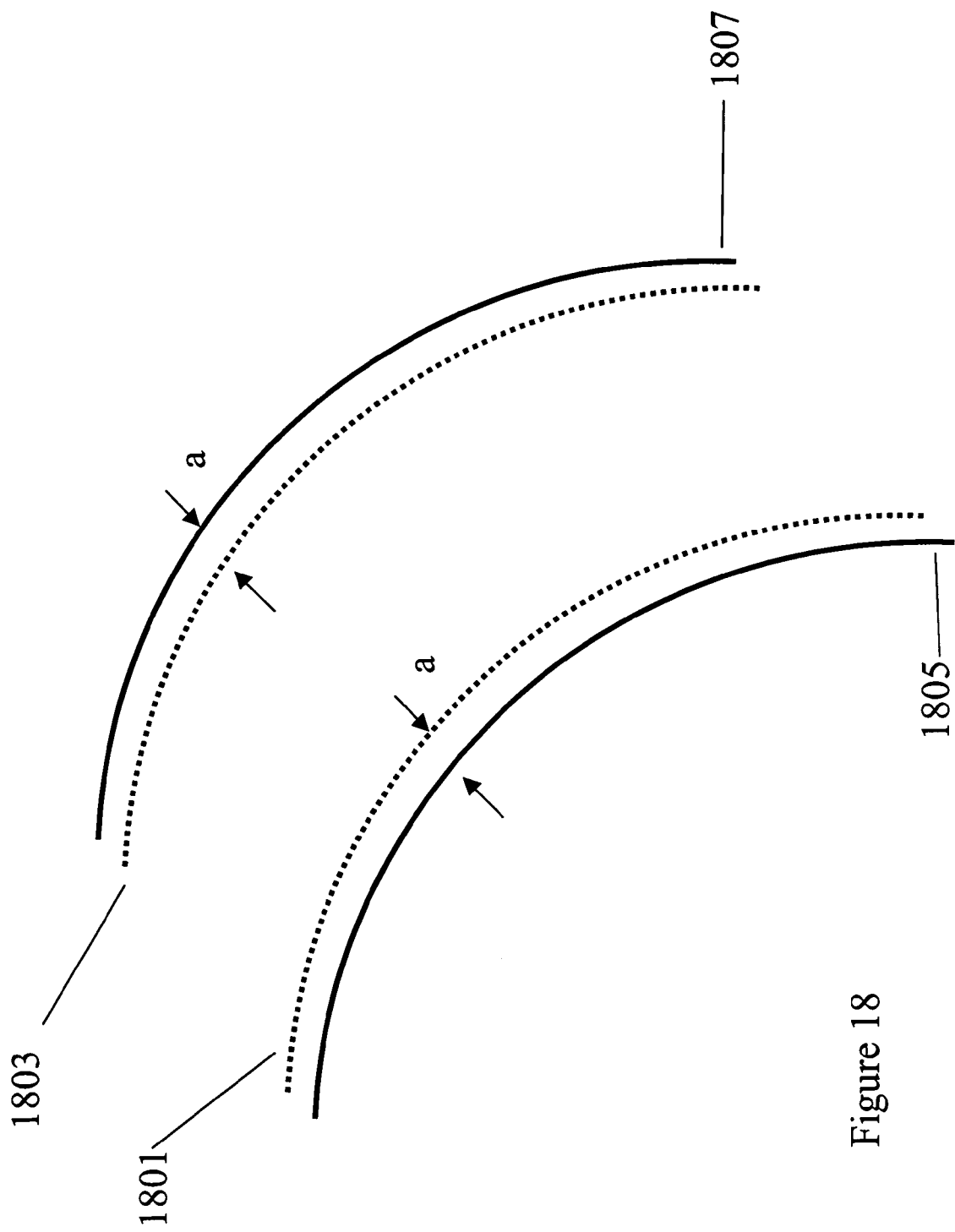
FIG. 18 illustrates schematically a pair of diffractive elements displaced longitudinally from their respective virtual contours in a correlated manner.

Another related approach to reflective amplitude control for a distributed optical structure may be referred to as element-displacement gray scale. It is often the case that desired reflective amplitude variations for the diffractive elements (i.e., longitudinal variation of the apodization function) occur slowly on the distance scale of individual diffractive element separations. In other words, the amplitude reflectivity desired may be relatively constant over many diffractive element spacings. In this case, it is possible to achieve reflective amplitude control using element-displacement gray scale. Element-displacement gray scale can be implemented in a correlated form or a statistical form. In the correlated form, correlated spatial displacements are introduced for two or more adjacent or non-adjacent diffractive elements. For example, as shown in FIG. 18, if one diffractive element 1805 is moved forward relative to its corresponding virtual contour 1801 by $a=\lambda_0/8n_{eff}$ and the next diffractive element 1807 is moved backward by the same amount relative to its corresponding virtual contour 1803, the signals from the two diffractive elements will cancel. If paired forward and backward displacements of smaller magnitudes are utilized in the example of FIG. 18, the effective reflective amplitude of the pair of diffractive elements can be adjusted to between about 0 and the maximum value (i.e., constructive interference) without affecting the overall phase of the signal from the correlated diffractive element pair. The opposite spatial displacements of the diffractive elements as shown in FIG. 18 introduce opposite phase shifts of the back-diffracted fields. The displacement of $a=\lambda_0/8n_{eff}$ gives rise to a phase shift having a magnitude of 90°, and the magnitude of the achieved phase shift scales linearly with displacement a. The net phase shift of the summed back-diffracted field has no net phase shift but has a displacement-dependent amplitude. Control over offsets of a set of two or more correlated diffractive elements can be employed to fully control the relative diffractive amplitudes of the set of correlated elements. The reflective phase of the correlated diffractive element set may be adjusted by longitudinally displacing the entire set, as described hereinabove. Correlated displacement of elements to achieve variable reflection also preserves areal diffracting region density (i.e., density of optical alterations), and therefore does not significantly affect the effective refractive index.

Element-displacement gray scale can be implemented in a statistical form. Reflective amplitude control may be achieved by statistically displacing the diffractive elements longitudinally from their corresponding virtual contours. This can be done most conveniently by dividing the distributed optical structure into sections each containing a plurality of virtual contours. To control the amplitude of a single section, diffractive elements are displaced from their respective virtual contours by a random amount within a range of [−c, +c]. Displacement of conveniently chosen diffractive elements should be trimmed to set the net phase shift of the section to a chosen value which is zero for pure amplitude control. Similar trimming can be employed to fine tune the net reflection amplitude of the section. The reflectivity of the set of diffractive elements is related to the rms value of the displacement $c_{rms}$ via diffraction theory calculations. The overall distributed optical structure is apodized section by section using the calibration of displacement coefficient $c_{rms}$ to net reflective amplitude. To achieve full amplitude control values of the displacement coefficient $c_{rms}$ up to $\lambda_0/8n_{eff}$ should be employed. As previously mentioned, a drawback of statistically distributed displacement values, however, is that the resulting overall reflective amplitude can only be designed within the precision dictated by the laws of statistical analysis. A combination of statistical diffractive element displacement and deterministic control is also possible as described in terms of trimming above. An initial set of diffractive element displacements with an rms value set to statistically provide the desired net reflective amplitude may be calculated. Then the sum of the fields generated may be calculated and adjusted to a precisely desired value by resetting the displacement of one or more diffractive elements.

FIGS. 23A and 23B illustrate schematically another example of element-displacement grayscale. In the example of FIG. 23A, a waveguide 2301 (a channel waveguide or planar waveguide, shown in cross-section) is shown having substantially uniformly spaced diffractive elements. A waveguide 2303 is also shown, in which diffractive elements are shown divided into subsets 2323, each corresponding to a subset 2319 of the diffractive elements of waveguide 2301. For each subset 2319 of five diffractive elements (five in this example; other numbers of diffractive elements per subset may be employed as appropriate), the first two elements are displaced as a unit toward the center element in subset 2323, and the last two elements are also displaced by the same distance also toward the center element. If the displacements and element widths are such that the displacements make it difficult or impossible to render all of the diffractive elements, the center diffractive element of each subset 2323 may be omitted (as in FIG. 23A; this may be the case for any subsets having an odd number of diffractive elements). Such omission of diffractive elements may be undesirable in cases wherein scattering losses for the diffractive element set should be minimized. These correlated displacements of diffractive elements reduce the overall diffracted amplitude of each of the subsets of five diffractive elements, as illustrated schematically in the phasor diagram of FIG. 24A. Two phasors are angularly displaced in one direction, while two others are displaced a similar amount in the other direction. If the center diffractive element were preset, its phasor would be directed along the axis of the diagram. In either case, the resultant phasor for subset 2323 is smaller in amplitude than the resultant phasor of the original uniformly-spaced subset 2319. The number of diffractive elements comprising the subsets determined the spatial resolution with which the diffractive amplitude may be varied within the entire diffractive element set, and also determined the degree of additional optical scattering loss induced by the element displacements. A larger number of elements per subset yields less amplitude control spatial resolution, while also affecting optical scattering losses. When designing the diffractive element set, the number of elements per subset may be chosen to yield a suitable compromise between amplitude control spatial resolution and optical scattering losses. Such losses are predominantly introduced by red-shifted spatial Fourier components introduced into the diffractive element set by the correlated displacement of the elements.

In the example of FIG. 23B, a waveguide 2331 (a channel waveguide or planar waveguide, shown in cross-section) is shown having substantially uniformly spaced diffractive elements. A waveguide 2333 is also shown, in which diffractive elements are shown divided into subsets 2315, each corresponding to a subset 2311 of the diffractive elements of waveguide 2331. For each subset 2311 of six diffractive elements (six in this example; other numbers of diffractive elements per subset may be employed as appropriate), the spacing among all six of the elements is reduced by the same amount, resulting in an "accordion-like" contraction of the diffractive element subset to yield subsets 2315. These correlated displacements of diffractive elements reduce the overall diffracted amplitude of each of the subsets of six diffractive elements, as illustrated schematically in the phasor diagram of FIG. 24B. Since the diffractive elements are displaced by differing amounts (so as to maintain constant, albeit reduced, element spacing throughout the subset), none of the corresponding phasors is parallel to any other. The resultant phasor for subset 2315 is smaller in amplitude than the resultant phasor of the original uniformly-spaced subset 2311. The same considerations regarding the choice of a number of diffractive elements per subset that are discussed above for the example of FIG. 23A are applicable to the example of FIG. 24B.

In addition, for the example of FIG. 23B, the diffractive elements are shown displaced toward the center of each diffractive element subset. Displacing the diffractive elements away from the center of each diffractive element set would yield similar phasor diagrams, hence similar control of diffractive amplitude, hence similar ability to tailor the diffractive amplitude through the entire diffractive element set to achieve a desired overall spectral passband. However, it can be shown by calculation or by empirical measurement that displacement of the diffractive elements toward the center of each subset results in a diffractive element set having relatively weaker red-shifted spatial Fourier components. Such red-shifted spatial Fourier components are often associated with scattering loss from waveguides. If the diffractive elements are displaced away from the center of each subset, red-shifted spatial Fourier components of the diffractive element set are relatively enhanced, potentially resulting in relatively higher optical scattering loss. The accordion-like correlated displacement approach might be described as a so-called "single-sideband" apodization method, since one can control whether diffractive element spatial Fourier components are preferentially red-shifted or blue-shifted relative to the main Fourier component (the "carrier" Fourier component, corresponding to the original, uniform spacing of the diffractive elements before any correlated displacements). Spatial Fourier component typically are generated both blue- and red-shifted relative to the carrier component, however, the "single-sideband" descriptor nevertheless may be employed to indicate that the absolute and relative magnitudes of red- and blue-shifted apodization-induced spatial Fourier components may be differentially controlled for mitigation of waveguide scattering loss.

In each of the examples of FIGS. 23A and 23B, symmetric displacement of diffractive elements of each subset alters the diffracted amplitude without affecting the relative phase. Relative displacements of the centroids of the correlated diffractive element subsets may provide control over the relative phases of optical signals diffracted by each subset in a manner similar to that of relative spatial shifting of individual diffractive element described hereinabove.

Modal Index Compensation

Figure 25:
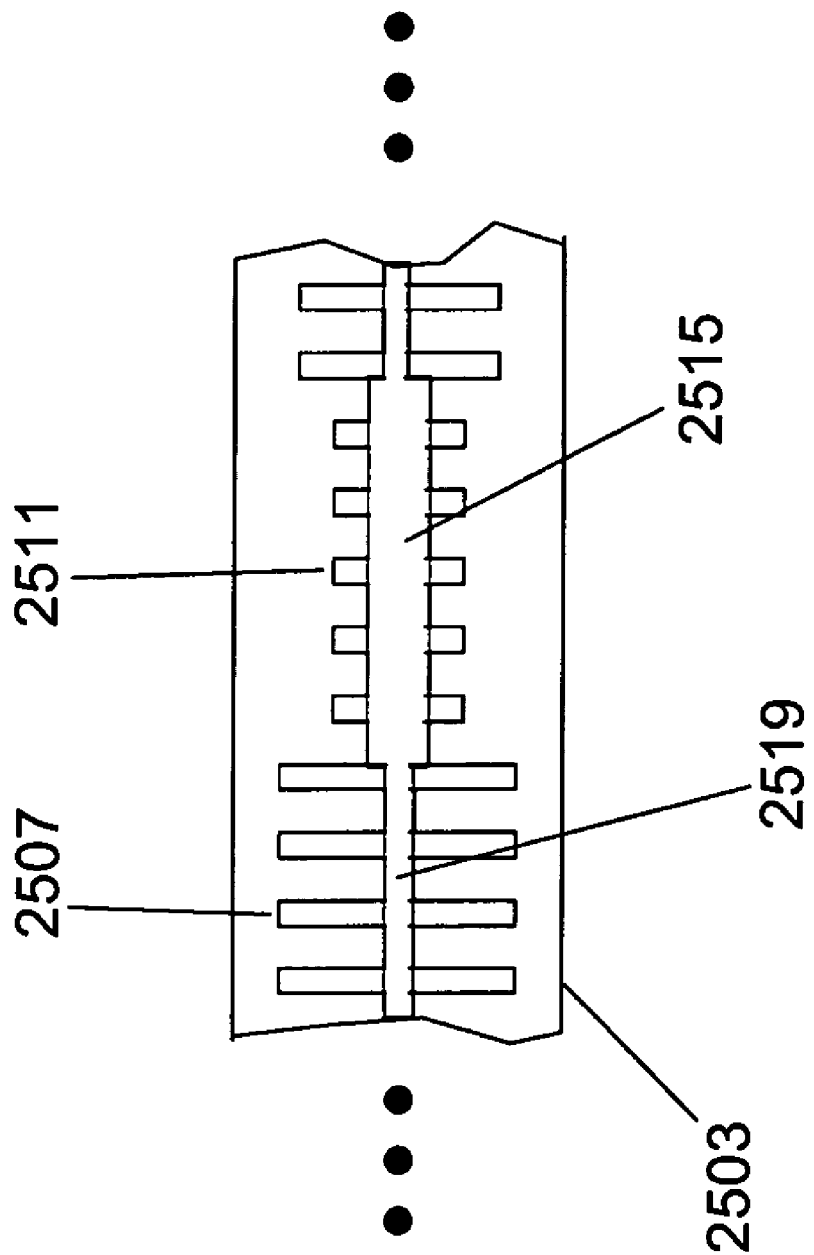
FIG. 25 illustrates schematically a channel waveguide with diffractive elements and modal index compensation.

FIG. 25 illustrates schematically a channel waveguide 2503. The respective diffracted amplitudes arising from the diffractive elements 2507 and 2511 are determined by the transverse extent of the respective diffractive elements. In this example, the diffracted amplitude arising from elements 2507 would presumably be larger than that arising from elements 2511, due to the greater transverse extent of elements 2507. However, this greater transverse extent of diffractive elements 2507 would typically result in a larger modal index over that portion of waveguide 2503, relative to the portion of the waveguide having elements 2511. A central index-compensating structure may be employed having a width varying along its length to compensate for such a modal index variation. A narrower section 2519 of the compensating structure spans the longer diffractive elements 250, while a wider section 2515 of the compensating structure spans the shorter diffractive elements 2511. The lengths of the diffractive elements and the widths of the compensating structure are chosen to yield the desired levels of diffracted amplitude while maintaining a substantially constant modal index along the length of the waveguide 2503. The compensating structure need not be centrally positioned, and may comprise one region or two or more non-contiguous regions.

CONCLUSIONS

It should be noted that all the individually discussed approaches to diffractive element amplitude and phase control may be combined with each other and implemented in all discussed and other diffractive element forms. Various additional modifications of the present invention will occur to those skilled in the art. Nevertheless, all derivations from the specific teaching of this specification that rely upon the principles and their equivalents through which the art has been advanced are properly considered within the scope of the invention as described and claimed.

It should be noted that control of the reflective amplitude of a diffractive element via: control of fill factor; control of diffractive element width; control of diffractive element density; control of spatial and/or angular displacement of element facets relative to a virtual contour; and control of element spacing have each been disclosed and discussed herein. In some of these discussions the virtual contours have been described as an equal phase contours, wherein paths from input to virtual contour to output have a constant optical length. In some diffractive structures, it may be advantageous to consider virtual contours that do not have an equal phase property. The utilization of any of the disclosed methods for controlling net diffractive element reflectivity can be applied to virtual contours of general character including those that are not equal phase virtual contours.

In summary, several powerful approaches to the control of diffractive element scattering amplitude (both magnitude and phase) are disclosed herein. Controlled virtual contour filling, or partial-fill gray scale, utilizes the fact that output fields arise from sub-fields generated by all points along a diffractive element to control the net reflection (i.e., diffracted signal) from that element. Width- or profile-based gray scale utilizes interference between front- and back-generated reflections to control the net diffracted signal from a diffractive element. Proportional-line-density gray scale (which might be viewed as analogous to partial-fill gray scale implemented for over multiple elements) utilizes a writing probability for each virtual contour to control the diffraction strength from groups of diffractive elements. Facet-displacement gray scale utilizes longitudinal and/or angular displacements of diffracting facets of a diffractive element relative to a corresponding virtual contour for controlling the overall reflected signal strength from the element. Element-displacement grayscale (which might be viewed as analogous to facet-displacement gray scale implemented over multiple elements) utilizes longitudinal displacement of diffractive elements (including correlated displacements) relative to their corresponding virtual contours to control the diffraction strength from groups of elements. These methods may be used in various combinations as well as separately. The partial-fill gray scale approach is especially useful in cases where multiple distributed optical structures must be overlaid in a common region of space. Using partially filled diffractive elements (i.e., diffractive elements not completely filled), distributed optical structures may be overlaid with little actual overlap between diffracting region(s) of the diffractive elements of the different structures. Control of diffractive element trench width or profile may be employed to adjust the scattering strength of overlapping elements to be a linear sum of their individual scattering strengths. Using facet-displacement or element-displacement grayscale, scattering strength of diffractive elements may be achieved without altering an effective refractive index of the optical device. Longitudinal displacements of entire diffractive elements or groups of elements relative to their corresponding virtual contours enables control over the relative amplitudes and phases of the diffracted signal components, and correlated displacements may be employed to achieve amplitude control without altering relative phases of the diffracted components. Combination of these diffractive element amplitude and phase control methods provides powerful means of achieving complicated spectral filtering functions as well as maintaining linearity in devices where multiple distributed optical structures must share the same space.

While the present disclosure has included exemplary embodiments that include distributed diffractive elements in planar waveguide, channel waveguide, and surface geometries, and on diffractive elements that are lithographically scribed, it is nevertheless the case that the methods and approaches presented herein are quite general and can be applied to distributed optical structures of diverse geometries comprising diffractive elements of a general nature active to scatter a portion of optical fields incident on them.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising:
an optical element having a set of at least two diffractive elements, wherein:
each diffractive element is arranged to diffract a corresponding component of an incident optical field with a corresponding diffractive element transfer function so that the diffractive element set collectively provides an overall set transfer function between an entrance optical port and an exit optical port;
each diffractive element comprises at least one diffracting region and is spatially defined with respect to a corresponding one of a set of diffractive element virtual contours, the diffracting regions having at least one altered optical property so as to enable diffraction of a portion of the incident optical field;
the virtual contours of the diffractive element virtual contour set are spatially arranged so that, if diffracting regions of the corresponding diffractive elements were to spatially coincide with the virtual contours, a resulting superposition of the diffracted components at a design wavelength would exhibit maximal constructive interference at the exit port;
the set of diffractive elements comprises at least one subset having at least two diffractive elements; and
the overall set transfer function is determined at least in part by longitudinal displacement of at least two diffractive elements of at least one of the subsets relative to the corresponding virtual contours.

2. The apparatus of claim 1, wherein the longitudinal displacement of the diffractive elements of the subset results in at least two diffractive elements of at least one of the subsets being spaced apart by a distance less than a distance between the corresponding virtual contours.

3. The apparatus of claim 2, wherein each of the displaced diffractive elements of the subset is displaced from its corresponding virtual contour by a same subset displacement distance.

4. The apparatus of claim 3, wherein:
the subset of diffractive elements comprises an even number of diffractive elements;
diffractive elements of a first half of the diffractive element subset are displaced toward a corresponding central virtual contour in a first longitudinal direction, and diffractive elements of a second half of the diffractive element subset are displaced toward the corresponding central virtual contour in a second longitudinal direction, the corresponding central virtual contour being located between the first and second halves of the subset; and
the diffractive element subset lacks a diffractive element corresponding to the central virtual contour.

5. The apparatus of claim 3, wherein:
the subset of diffractive elements comprises an odd number 2N+1 of diffractive elements; and
diffractive elements of a first group of N elements of the diffractive element subset are displaced toward a central diffractive element of the subset in a first longitudinal direction, and diffractive elements of a second group of N elements of the diffractive element subset are displaced toward the central diffractive element in a second longitudinal direction, the central diffractive element of the subset being located between the first and second groups of N elements of the subset.

6. The apparatus of claim 3, wherein the diffractive element set comprises multiple diffractive element subsets, and the subset displacement distance varies among the multiple diffractive element subsets so as to yield the set transfer function for the diffractive element set.

7. The apparatus of claim 2, wherein the longitudinal displacement of the diffractive elements of the subset results in the diffractive elements of the subset being substantially uniformly spaced apart by a subset element spacing that is less than the distance between the corresponding virtual contours.

8. The apparatus of claim 7, wherein the diffractive element set comprises multiple diffractive element subsets, and the subset element spacing varies among the multiple diffractive element subsets so as to yield the set transfer function for the diffractive element set.

9. The apparatus of claim 1, wherein each subset of diffractive elements comprises two or more diffractive elements.

10. The apparatus of claim 1, wherein each subset of diffractive element comprises less than about fifty diffractive elements.

11. The apparatus of claim 1, wherein the diffractive element set comprises multiple diffractive element subsets, and a number of diffractive elements in each subset varies among the multiple subsets so a to yield the set transfer function.

12. The apparatus of claim 1, wherein the diffractive element set comprises multiple diffractive element subsets, and relative longitudinal displacements of the multiple subsets at least in part determine the set transfer function.

13. The apparatus of claim 1, wherein the longitudinal displacement of the diffractive elements of the subset results in at least two diffractive elements of at least one of the subsets being spaced apart by a distance greater than a distance between the corresponding virtual contours.

14. The optical apparatus of claim 1, wherein the optical element comprises a channel waveguide substantially confining in two transverse dimensions optical fields propagating in one dimensions therein, each of the diffractive element virtual contours being a curvilinear virtual contour, each of the diffracting regions being a curvilinear diffracting segment.

15. The optical apparatus of claim 1, wherein the optical element comprises a planar waveguide substantially confining in one transverse dimension optical fields propagating in two dimensions therein, each of the diffractive element virtual contours being a curvilinear virtual contour, each of the diffracting regions being a curvilinear diffracting segment.

16. The optical apparatus of claim 1, wherein the optical element is arranged to enable propagation of optical fields in three dimensions therein, each of the diffractive element virtual contours being a surface virtual contour, each of the diffracting regions being a diffracting surface areal segment.

17. The optical apparatus of claim 1, wherein the optical element comprises a diffraction grating, each of the diffractive element virtual contours being a curvilinear virtual contour, each of the diffracting regions being a curvilinear diffracting segment.

18. An optical apparatus, comprising:
an optical element having a set of at least two diffractive elements, wherein:
each diffractive element is arranged to diffract a corresponding component of an incident optical field with a corresponding diffractive element transfer function between an entrance optical port and an exit optical port and are arranged so that the diffractive element set collectively provides an overall set transfer function between the entrance optical port and the exit optical port;
each diffractive element comprises at least one diffracting region having at least one altered optical property so as to enable diffraction of a portion of the incident optical field, wherein the at least one diffracting region is longitudinally offset with respect to a virtual contour of the respective diffractive element; and
the at least one diffracting regions of the diffractive elements are arranged so as to provide the corresponding diffractive element transfer function between the entrance optical port and the exit optical port.

19. The apparatus of claim 18, wherein:
each diffractive element comprises at least another diffracting region; and
the diffracting regions of each diffractive element are arranged so as to collectively provide the corresponding diffractive element transfer function between the entrance optical port and the exit optical port.

20. The apparatus of claim 18, wherein the optical element:
a) comprises a channel waveguide substantially confining in two transverse dimensions optical fields propagating in one dimension therein, each of the diffracting regions being a curvilinear diffracting segment;
b) comprises a planar waveguide substantially confining in one transverse dimension optical fields propagating in two dimensions therein, each of the diffracting regions being a curvilinear diffracting segment;
c) enables propagation of optical fields in three dimensions therein, each of the diffracting regions being a diffracting surface areal segment; or
d) comprises a diffraction grating, each of the diffracting regions being a curvilinear diffracting segment.

* * * * *

UNITED STATES PATENT AND TRADEMARK OFFICE
CERTIFICATE OF CORRECTION

PATENT NO. : 7,773,842 B2
APPLICATION NO. : 11/280876
DATED : August 10, 2010
INVENTOR(S) : Christoph M. Greiner et al.

It is certified that error appears in the above-identified patent and that said Letters Patent is hereby corrected as shown below:

Title Page Item (56), Other Publications, "for U.S. Appl. No." should read --for JP Appl. No.--.

Title Page 3, Other Publications, "Domain-Spatial-Spectral" should read --Domain Spatial-Spectral--.

Title Page 4, Other Publications, "mailed Feb. 2, 2010 for" should read --mailed Feb. 1, 2010 for--.

Title Page 2, Foreign Patent Documents, "JP    2003033805    2/2003" should be removed.

Col. 31, line 7, "subsets so a to yield" should read --subsets so as to yield--.

Signed and Sealed this
Twenty-fifth Day of January, 2011

David J. Kappos
*Director of the United States Patent and Trademark Office*